United States Patent [19]
Inui

[11] Patent Number: 4,890,510
[45] Date of Patent: Jan. 2, 1990

[54] CENTER DIFFERENTIAL FOR FOUR-WHEEL DRIVE VEHICLE

[75] Inventor: Masaki Inui, Toyota, Japan

[73] Assignee: Toyota Jidosha Kabushiki Kaisha, Aichi, Japan

[21] Appl. No.: 156,792

[22] Filed: Feb. 17, 1988

[30] Foreign Application Priority Data

Feb. 20, 1987 [JP] Japan .................. 62-37198

[51] Int. Cl.$^4$ .................... F16H 1/42; F16H 1/44
[52] U.S. Cl. ......................... 74/711; 74/114; 74/715
[58] Field of Search ............. 74/66 ST, 711, 714, 74/710.5, 715; 192/70.11, 70.16, 70.2, 109 R

[56] References Cited

U.S. PATENT DOCUMENTS

| | | | |
|---|---|---|---|
| 3,848,518 | 11/1974 | Martin | 192/85 AA X |
| 4,290,321 | 9/1981 | Wilson | 74/711 |
| 4,474,080 | 10/1984 | Day | 74/711 |
| 4,594,913 | 6/1986 | Opitz | 74/711 |
| 4,718,302 | 1/1988 | Nussbaumer et al. | 74/714 X |
| 4,757,727 | 7/1988 | Teraoka et al. | 74/714 X |
| 4,771,653 | 9/1988 | Teraoka | 74/711 X |
| 4,781,078 | 11/1988 | Blessing et al. | 74/711 |
| 4,781,079 | 11/1988 | Takahashi | 74/711 |

FOREIGN PATENT DOCUMENTS

| | | |
|---|---|---|
| 55-72420 | 5/1980 | Japan . |
| 61-102329 | 5/1986 | Japan . |
| 61-191434 | 8/1986 | Japan . |
| 1262162 | 10/1986 | U.S.S.R. .................. 74/711 |

Primary Examiner—Dwight G. Diehl
Attorney, Agent, or Firm—Oliff & Berridge

[57] ABSTRACT

A center differential for a four-wheel drive vehicle comprises three members, i.e.: an input member rotatably connected for rotations to the output shaft of a transmission; a first output member for transmitting rotation of the input member to a rear wheel output shaft; and a second output member for transmitting rotation of the input member to a front wheel output shaft. Frictional engaging elements are interposed between any two of those three members, and a applying force transforming device for generating a force to engage the frictional engaging elements on the basis of a tangential force which is generated relatively between any of the three members are also provided. Thus, when tangential force generated as a torque is transmitted among the three members, an axial force is generated as a component of the tangential force to increase the engaging force of the frictional engaging elements so that a differential lock is established to automatically adjust the torque distribution ratio between the rear and front wheels to a proper value.

28 Claims, 16 Drawing Sheets

CENTER DIFFERENTIAL FOR FOUR-WHEEL DRIVE VEHICLE

BACKGROUND OF THE INVENTION

The present invention relates to a center differential which is mounted on a four-wheel drive vehicle for differentiating the front and rear wheels and, more particularly, to a differential equipped with a mechanism for restraining the differential.

In a vehicle such as a passenger car, the four-wheel drive state, in which the driving force is transmitted to all the front and rear wheels, is superior in running stability and ability to withstand rough road driving, as is well known in the art. In the four-wheel drive state in which the front and rear wheels are connected directly to the output shaft of a transmission, moreover, it is also well known in the art that a braking phenomenon is caused during cornering due to the difference in the number of rotations of the front and rear wheels. Therefore, the so-called "full-time four-wheel drive car" (i.e., "full-time 4 WD") is equipped with a center differential to differentiate the front and rear wheels. With this center differential, however, in case either the front or rear wheels stick, no driving force will be transmitted to the remaining wheels. In order to avoid this trouble, a differential restraining means is provided in addition to the center differential. An example of this provision is disclosed in Japanese Patent KOKAI No. 55-72420.

In the differential restraining means disclosed, there is used a differential gear set which is composed of a pair of side gears, a pinion gear meshing with the side gears, and a shaft and casing holding the pinion gear. The output shaft of a transmission is so connected to the shaft of the pinion as to rotate the pinion gear therearound, and one of the side gears is connected to a rear wheel output shaft whereas the other side gear is connected to a front wheel output shaft, thus constituting the center differential. A multi-disc clutch is interposed between the pinion holding the casing and the other side gear and is engaged to restrain the differential by a piston which is hydraulically driven.

In recent trials, on the other hand, a viscous coupling has been used in the transfer to perform not only the differentiation of the front and rear wheels but also the control of the transmission torque due to the difference in the number of rotations.

In the differential restraint for engaging the differential restraining clutch by a hydraulically actuated piston, not only a hydraulic circuit but also electric devices such as sensors or arithmetic elements for controlling hydraulic devices are required which complicate control devices so that the system becomes seriously expensive. Since, moreover, an oil pressure source is naturally required, it can be utilized as it is if the transmission is automatic, but a special oil pressure source has to be provided in the case of a manual transmission. Therefore, another problem is that the production cost is raised because the parts of the automatic transmission cannot be commonly used.

If a differential restraining piston to be hydraulically driven is used, it is conceivable to adjust the transmission torque capacity of the differential restraining clutch to change the torque distribution between the front and rear wheels in accordance with the running state by adjusting the oil pressure for driving the piston. If this control is accomplished, the running performance can be better improved. For this control, however, there are required a number of sensors of high precision and quick response. In fact, however, an electric system or a hydraulic system may be delayed, which would cause a problem in that proper differential restraint cannot be achieved.

The aforementioned differential gear set having the paired side gears and the pinion gear may have disadvantages due to their large external size or weight. In order to set the torque distribution between the front and rear wheels at a ratio other than 50:50, moreover, a special structure is required to change the constructions of the gears drastically, thus raising still another problem of a further increase in the weight.

Therefore, the differential gear set having the paired side gears and the pinion meshing with the former is currently replaced by a planetary gear set in the center differential. In case the planetary gear set is used in the center differential, it is the current practice to use helical gears so as to reduce the noise (such as tooth hitting noises due to back-lash). Special parts for receiving the thrust are required to raise a further problem of rising production cost.

In the aforementioned viscous coupling, on the other hand, a number of discs are arranged in a viscous fluid such as silicone oil to transmit the torque through the shearing resistance of the viscous fluid following relative rotations of the discs. As a result, the transfer using the viscous coupling will transmit the higher torque as the difference between the number of rotations of the front and rear wheels increases. Thus, such transfer is liable to be encountered by a braking phenomenon during cornering having a large difference in the number of rotations between the front and rear wheels and is troubled by deterioration in fuel mileage. Moreover, the viscous coupling per se is expensive and is remarkably difficult to tune for attaining the desired characteristics.

The so-called "TORSEN differential" using a worm and a worm wheel is also known in the art. This differential can perform the differential restraint of torque response but cannot avoid the braking phenomenon during cornering from a theoretical standpoint. Furthermore, the torque distribution cannot be set at a ratio other than 50:50. The structure is also complex and expensive. In addition, a further disadvantage is that another planetary gear set is required for setting the torque distribution at a ratio other than 50:50.

SUMMARY OF THE INVENTION

An object of the present invention is to provide a center differential for a four-wheel drive vehicle, which can automatically adjust the restraint of differentiation and the adjustment of a torque distribution ratio with simple construction.

Another object of the present invention is to provide a center differential which can achieve differential restraint on the basis of a tangential force to be generated between an input member and an output member.

In order to achieve these objects, the center differential according to the present invention is constructed to engage or disengage frictional engaging means for the differential restraint by making use of a torque which is input from either the transmission or the front or rear wheel output shaft. According to the present invention, there is provided a center differential for a four-wheel drive vehicle, comprising three members, i.e., an input member for transmitting force from the output shaft of a transmission; a first output member for transmitting the rotation of said input member to a rear wheel output shaft; and a second output member for transmitting the rotation of said input member to a front wheel output shaft, frictional engaging means interposed between any two of said three members; and engaging force transforming means for generating a force to engage said frictional engaging means on the basis of a tangential force which is generated relatively between any of said three members.

Thus, the torque, which is transmitted from the transmission to the input member, is distributed between the rear wheel output shaft and the front wheel output shaft by the first and second output members, respectively. In this case, a force to engage the frictional engaging means is generated by the engaging force transforming means in accordance with the tangential force accompanying the rotation of any of those three members so that the frictional engaging means is engaged by the engaging force according to the tangential force to restrain the center differential. As a result, is transmitted torque between the two members interposing the frictional engaging means so that the torque distribution ratio between the front and rear wheels is changed.

The center differential of the present invention may be constructed such that the aforementioned three members are helical gears so that the engaging force is exerted upon the aforementioned frictional engaging means by the tangential force which is generated on the tooth surfaces of the helical gears in accordance with the torque transmission.

With this structure, the engaging force of the frictional engaging means is augmented in accordance with torque transmitted through the center differential so that differential restraint is strengthened in accordance with the increase in the input torque.

The aforementioned frictional engaging means may be constructed of a multi-disc clutch, and tangential force generated due to differences in the number of rotations between the first and second output members may be freely adjusted by a cam mechanism for transforming the tangential force into an axial force directed to engage the multi-disc clutch.

With this structure, the torque distribution ratio can be controlled by the differential restraint according to the torque difference between the front and rear wheels.

Other objects and advantages of the present invention will be easily understood from the following description.

DETAILED DESCRIPTION OF THE PREFERRED EMBODIMENTS

Figure 1:
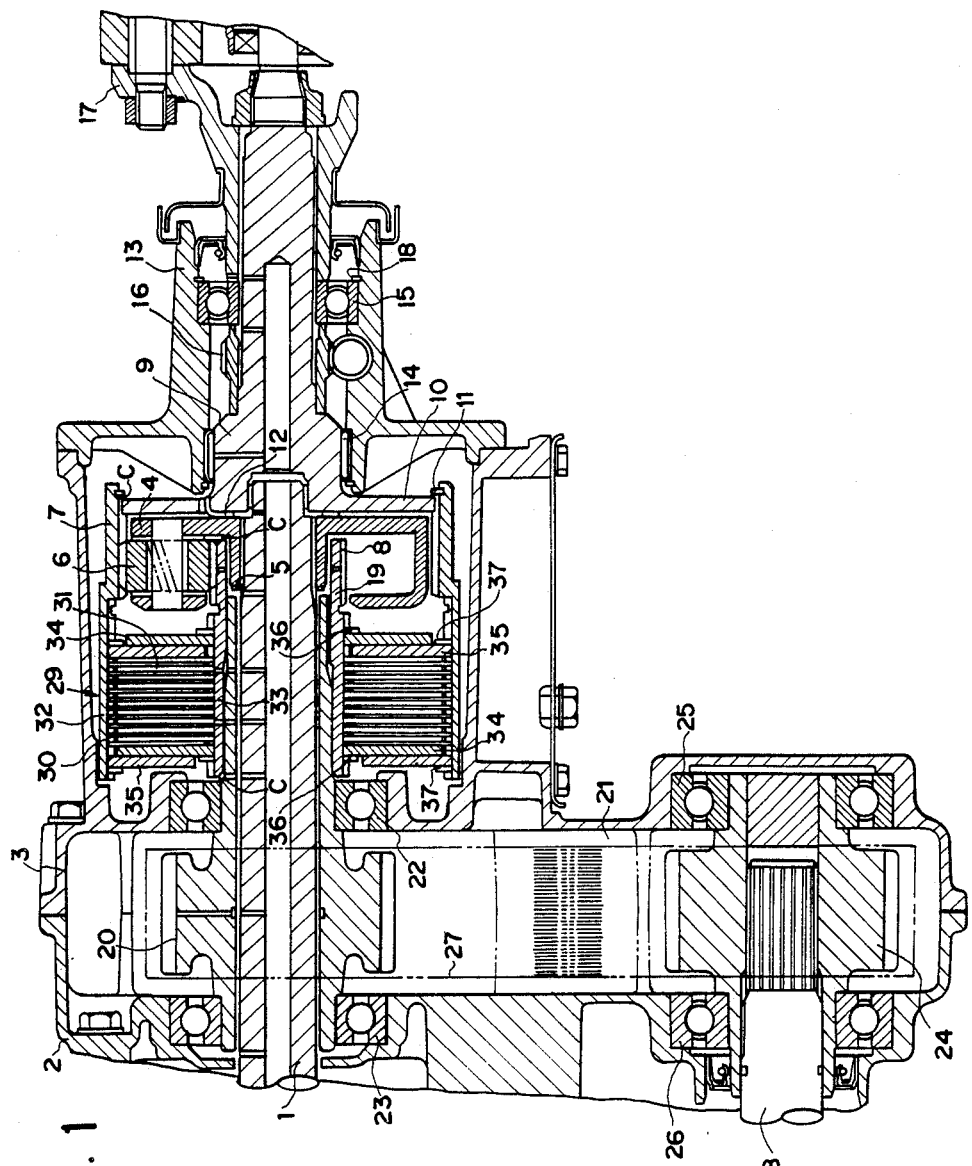
FIG. 1 is a sectional view showing one embodiment of the present invention.

FIG. 1 is a sectional view showing one embodiment in which the present invention is applied to the differential restraining mechanism of a four-wheel drive transfer system using a planetary gear set as a center differential. The four-wheel drive transfer will be described first of all. An input shaft (or the output shaft of a (not-shown) transmission) 1 for transmitting a driving force from the transmission extends from a front casing 2 into a rear casing 3 connected to the front casing 2. To the extending end portion of the input shaft 1 (located at the righthand end in FIG. 1), there is splined a carrier 4 of the planetary gear set acting as the center differential. The carrier 4 is blocked from moving leftward in FIG. 1 by a snap ring 5. The carrier 4 retains a helical pinion gear 6 which in turn meshes with a ring gear 7 and a sun gear 8. For these engagements, both the ring gear 7 and the sun gear 8 are naturally helical ones. On the other hand, the carrier 4 and the pinion gear 6 act as input members. Because of the helical teeth, the pinion gear 6 is caused by the tangential force on its tooth surface to apply to the sun gear 8 a rightward axial driving force and the ring gear 7 a leftward axial driving force, as seen from FIG. 1.

The ring gear 7 is splined to the outer circumference of a flange 10, which is formed at the base end of a rear wheel output shaft 9, and is prevented by a snap ring 11 from coming out leftward in FIG. 1 while setting a predetermined clearance C between itself and the snap ring 11. This setting allows the ring gear 7 to move leftward in FIG. 1 by the length of the clearance C. A thrust spacer 12 is sandwiched between the end faces of the flange 10 and the carrier 4 so that the carrier 4 is axially retained by the thrust spacer 12 and the snap ring 5. The rear wheel output shaft 9 is rotatably held by a pair of bearings 14 and 15 in an extension housing 13 which is connected to the rear casing 3. A speed meter drive gear 16 is fitted on the rear wheel output shaft 9 between the bearings 14 and 15, and a companion flange 17 is fixed to the other end out of the extension housing 13 of the rear wheel output shaft 9. The bearing 15 interposed between the speed meter drive gear 16 and the companion flange 17 is fixed in the axial direction by a snap ring 18 so that the rear wheel output shaft 9 is fixed in the axial direction.

On the other hand, the sun gear 8 forms part of the outer circumference of a sun gear shaft 19, which is so splined to the outer circumference of the boss extending from a drive sprocket 20 to the planetary gear set as to move in the axial direction. The drive sprocket 20 itself is rotatably fitted on the outer circumference of the aforementioned input shaft 1.

Moreover, the drive sprocket 20 is positioned in a chain chamber 21, which is formed in the front casing 2 and the rear casing 3, and is rotatably held by bearings 22 and 23, respectively, with respect to the front and rear casings 2 and 3. In the chain chamber 21, there is arranged in parallel with the drive sprocket 20 a driven sprocket 24 which is also rotatably held by a pair of bearings 25 and 26, respectively, with respect to the front and rear casings 2 and 3. A silent chain 27 is made to run on those sprockets 20 and 24 to establish a chain transmission. A front wheel output shaft 28 is inserted into and splined to that driven sprocket 24 along the center axis of the latter.

Thus, by rotating the carrier 4 together with the input shaft 1, the rear wheel output shaft 9 is rotated through the ring gear 7, and the front output shaft 28 is rotated through the sun gear 8 and the chain transmission. This means that the ring gear 7 and the sun gear 8 provide the output members of the center differential.

Next, the mechanism for restraining the differential will be described. In the embodiment shown in FIG. 1, the differential restraining mechanism is constructed of a multi-disc clutch 29. This multi-disc clutch 29 is composed of a multiplicity of friction plates (clutch discs 30 and clutch plates 31), which are paired and arranged alternately to face each other in each pair. The clutch discs 30 are splined to the inner circumference of a generally cylindrical clutch drum 32 acting as a first holding member. This clutch drum 32 is fixed to the aforementioned ring gear 7 to form an integral structure. On the other hand, the outer circumference of the aforementioned sun gear shaft 19, as located at the lefthand side of the sun gear 8 in FIG. 1, is formed with splines to provide a clutch hub 33, to which is splined the clutch plates 31. The clearance C is formed between one end of the sun gear shaft 19 formed with the clutch hub 33 and the aforementioned carrier 4 and between the other end and the aforementioned bearing 22 so that the sun gear shaft 19 is allowed to move to the right and left by the stroke of the clearance C. Back plates 34 and 35 are also alternately arranged to push the clutch discs 30 and the clutch plates 31 and are fitted on the clutch drum 32 or the clutch hub 33 by means of snap rings 36 and 37. In the differential restraining mechanism thus far described, the clutch drum 32 and the clutch hub 33 are moved in opposite directions by the axial forces which are generated by the torque transmission among the aforementioned pinion gear 6, ring gear 7 and sun gear 8. As a result, the clutch discs 30 and the clutch plates 31 are brought into and out of engagement through the respective back plates 34 and 35. In short, the helical gears 6, 7 and 8 and the axially movable clutch drum 32 and hub 33 constitute together engaging force transforming means for transforming tangential force of the center differential into axial force.

With the construction thus far described, when the carrier 4 and the pinion gear 6 rotate with the input shaft 1, the driving force is distributed through the ring gear 7 to the rear wheel output shaft 9 and through the sun gear 8 to the front wheel output shaft 28. In this case, the axial force is exerted leftward in FIG. 1 upon the ring gear 7 and rightward in FIG. 1 upon the sun gear 8 because the pinion gear 6 has the helical teeth. The ring gear 7 is splined to the outer circumference of the flange 10 of the rear wheel output shaft 9 so that it can move in the axial direction. Thus, the ring gear 7 is moved together with the clutch drum 32 leftward in FIG. 1 as it receives the torque from the pinion gear 6. On the other hand, the sun gear shaft 19 is moved rightward in FIG. 1 by the torque transmitted from the pinion gear 6 because it has clearances C at both its ends. As a result of this movement, the clutch disc 30 and the clutch plate 31 are clamped into engagement with each other to establish a frictional force by one back plate 35 (as located at the righthand side of FIG. 1) carried on the clutch drum 32 and the other back plate 34 (as located at the lefthand side of FIG. 1) carried on the clutch hub 33. In other words, the ring gear 7 and the sun gear 8 are coupled through the aforementioned multidisc clutch 29 so that the differentiation is restrained according to the magnitude of the frictional force of the multi-disc clutch 29. Since the frictional force in the multi-disc clutch 29 is increased or decreased according to the axial force proportional to the torque inputted from the carrier 4 in the center differential, the center differential is restrained according to the input torque engaged thereto. In short, the torque is transmitted through the multi-disc clutch 29 between the ring gear 7 and the sun gear 8 so that the torque distribution ratio between the front and rear wheels will change in accordance with the torque transmission capacity of the multi-disc clutch 29. In case the front or rear wheels slip to establish a difference in rotation or torque, for example, the torque of the front or rear wheels, which become unnecessary because of idle rotation, is partially or whole transmitted to the other wheels through the multi-disc clutch 29 so that the loss of driving force can be minimized or eliminated as a whole. This change of torque transmission is caused depending upon the balance of the forces among the components specified above so that it can be effected automatically and instantly without any special control.

In the differential thus constructed, the torque is input from the ring gear 7 and the sun gear 8 when the vehicle is to be decelerated or braked. In this decelerating or braking operation, axial force is established rightward of FIG. 1 in the ring gear 7 whereas axial force is established leftward of FIG. 1 in the sun gear 8, both being in the opposite directions to the aforementioned ones. Then, the clutch drum 32 and the clutch hub 33 are moved in directions opposite to those aforementioned ones so that the outermost of the back plates 34 and 35 clamp the clutch discs 30 and the clutch plates 31 through the innermost of the back plates 34 and 35 to engage the multi-disc clutch 29. In this case, too, the frictional force (i.e., the transmission torque capacity) to be established by the multi-disc clutch 29 grows in proportion to the axial force. When the engine is abruptly braked, the center differential is substantially restrained to ensure braking.

As will be apparent from the description thus far, the differential restraint by the multi-disc clutch 29 becomes more intense for higher input torque from the carrier 4. This differential restraint raises no serious problem during cornering because the accelerator pedal is released for the run to drop the engine output power.

This means that the tight corner braking phenomenon can be prevented in the center differential.

Figure 2:
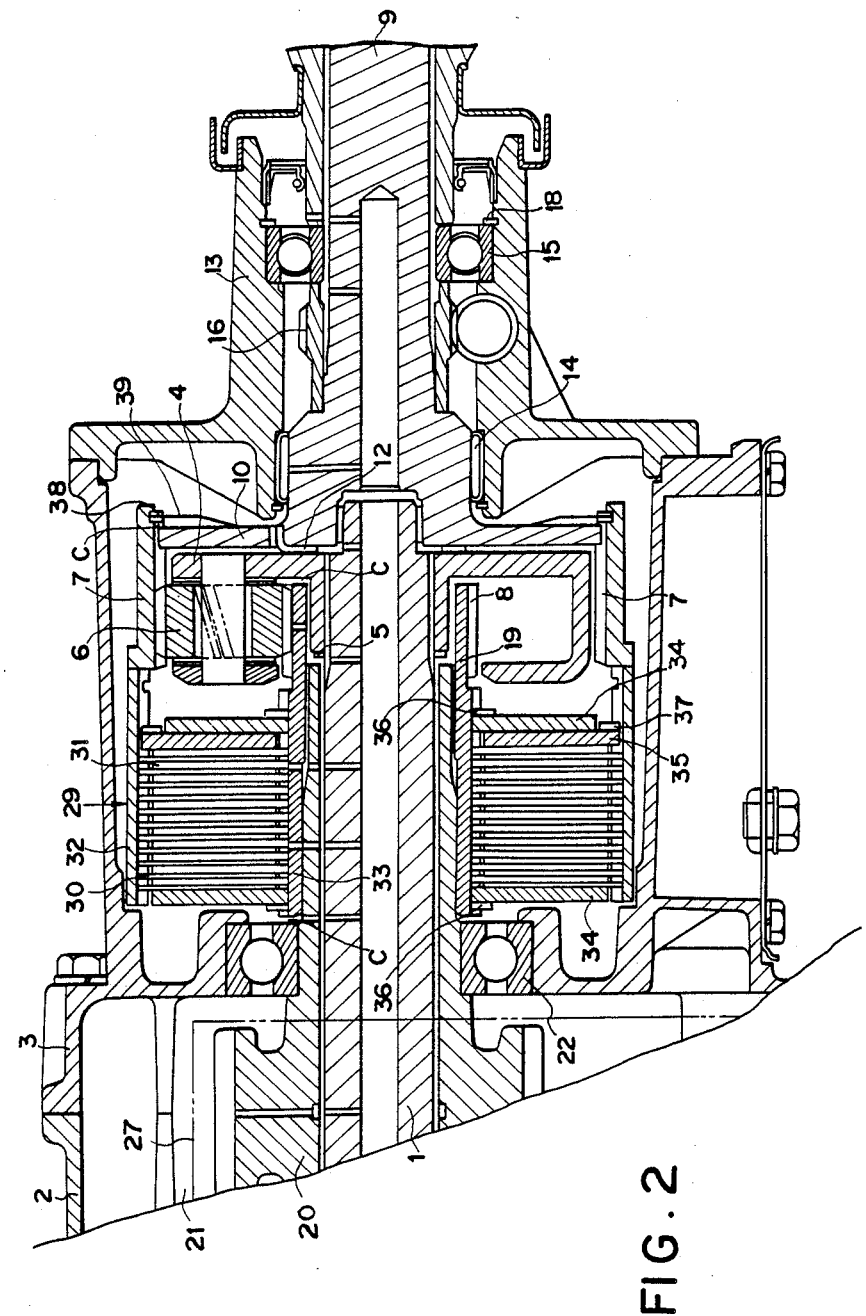
FIG. 2 is a sectional view showing an essential portion of a second embodiment.

FIG. 2 is a sectional view showing an essential portion of a second embodiment of the present invention, in which the differential restraint has different capacities between acceleration and deceleration.

The clutch drum 32 is arranged with a back plate 35 only at the right end of FIG. 2 of the multiple clutch discs 30 and plates 31. The back plate 35 is so fitted by the snap ring 37 that it is prevented from moving rightward in FIG. 2. Thus, the engaging force is established in the multi-disc clutch 29 only when the clutch drum 32 moves to the left of FIG. 2 as the input torque from the carrier 4 increases. In the end portion of the ring gear 7 projecting from the flange 10 of the rear wheel output shaft 9, there is fitted a pair of snap rings 38 which are spaced with a predetermined clearance C from the end face of the flange 10. The outer circumferences of the snap rings 38 retain belleville spring 39 in forced contact with the end face of the flange 10. As a result, the ring gear 7 and the clutch drum 32 are preloaded rightward in FIG. 2 to normally position the ring gear 7 and the clutch drum 32 in the righthand limit positions (without any play at the lefthand side of FIG. 2) of FIG. 2. The remaining construction is similar to that shown in FIG. 1.

With the structure shown in FIG. 2, when torque is input (for acceleration) through the carrier 4, the sun gear shaft 19 moves rightward in FIG. 2, and axial force in the leftward direction of FIG. 2 is exerted upon the ring gear 7. While the axial force is weaker than the elastic force of the aforementioned belleville spring 39, the ring gear 7 and the clutch drum 32 do not move in the axial direction. In this state, force is exerted upon the multi-disc clutch 29 only from the clutch hub 33 so that the clutch engaging force is so weak as to provide a differential restraint of low torque. As the axial force exerted upon the ring gear 7 exceeds the elastic force of the belleville spring 39, the ring gear 7 and the clutch drum 32 move to the left of FIG. 2 while flexing the belleville spring 39. Then, the clutch discs 30 and the clutch plates 31 are clamped into engagement by the individual back plates 34 and 35. As a result, differential restraint is effected by the frictional force generated at the multi-disc clutch 29.

For deceleration, on the contrary, torque is input from the ring gear 7 and the sun gear 8 so that axial force is exerted rightward in FIG. 2 upon the ring gear 7 and leftward in FIG. 2 upon the sun gear 8. Since, in this case, the ring gear 7 and the clutch drum 32 are blocked from moving rightward, the force exerted upon the multi-disc clutch 29 is restricted to the axial force resulting from the movement of the sun gear shaft 19 so that the engaging force of the multi-disc clutch 29 is weaker than that for acceleration. The four-wheel drive car manufactured on the basis of the aforementioned front-engine rear-drive car will have its center of gravity shifted forward during deceleration to have its front wheels slip. This slip of the front wheels is prevented by the structure shown in FIG. 2 because of the increase, if any, in the transmission of torque to the front wheels, which is caused by differential restraint during the deceleration, is small. In addition to the effects obtainable from the embodiment shown in FIG. 1, the structure shown in FIG. 2 attains another advantage i.e., an increase in stability during the decelerating or braking.

As will be understood from the embodiments thus far described, according to the present invention, the situations of differential restraint can be changed in accordance with the settings of the clearances and the back plates. Taking this concept into consideration, the differential restraint may be effected only during the acceleration, as shown in FIG. 3.

Figure 3:
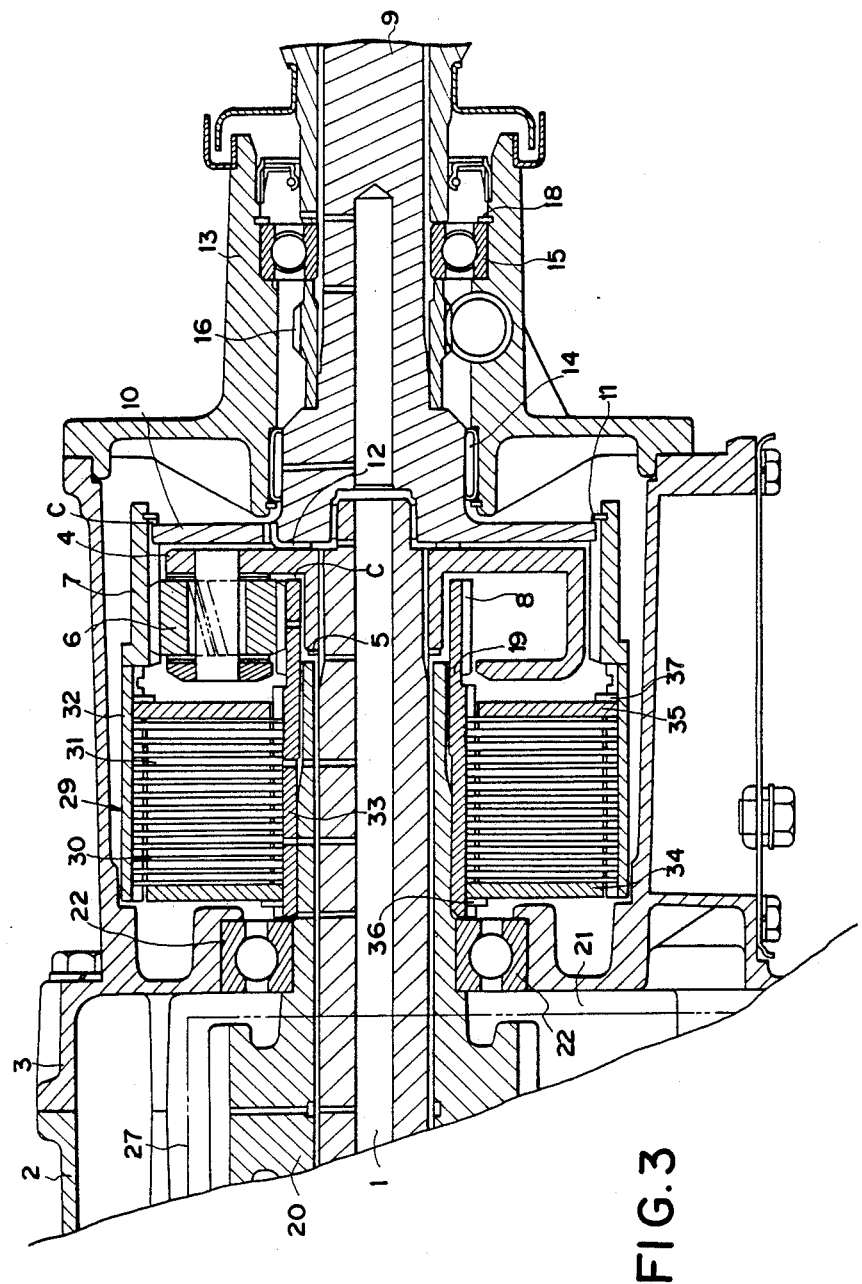
FIG. 3 is a sectional view showing an essential portion of a third embodiment.

As seen from FIG. 3, the ring gear 7 is so spaced by the clearance C from the snap ring 11 as to move leftward in FIG. 3 only when it receives torque from the pinion gear 6. In the clutch drum 32 made integral with that ring gear 7, there is fitted by the snap ring 37 the back plate 35 which is used to push the clutch discs 30 and the clutch plates 31 only to the left in FIG. 3. On the other hand, the sun gear shaft 19 has its left end (as located side of FIG. 3) abutting against the bearing 22 so that it is allowed to move only rightward of FIG. 3. On the clutch hub 33 of the sun gear shaft 19, moreover, there is fitted by the snap ring 36 only one back plate 34 which is used to push the clutch discs 30 and the clutch plates 31 only to the right in FIG. 3. Here, the directions, in which the clutch drum 32 and the clutch hub 33 can move, are taken when the multi-disc clutch 29 is not engaged. On the other hand, when the multi-disc clutch 29 is released after being once engaged, the moving directions of the clutch drum 32 and the clutch hub 33 are naturally opposed to those described above. The remaining construction of the embodiment shown in FIG. 3 is similar to that of the embodiment shown in FIG. 1.

With the structure shown in FIG. 3, when torque is input from the carrier 4 in accordance with acceleration, the axial force in the leftward direction of FIG. 3 is exerted upon the ring gear 7 and the clutch drum 32, because the gears 6, 7 and 8 have the helical teeth, so that the ring gear 7 and the clutch drum 32 are moved leftward FIG. 3. On the other hand, the sun gear shaft 19 receives the rightward axial force to move in the same direction. With these movements, the clutch discs 30 and the clutch plates 31 are clamped by the individual back plates 34 and 35 to establish the frictional forces, by which is caused differential restraint so that the multi-disc clutch 29 performs the predetermined torque transmission between the ring gear 7 and the sun gear 8, i.e., between the front wheels and the rear wheels.

For deceleration, on the contrary, torque is input from the ring gear 7 and the sun gear 8 so that these gears 7 and 8 receive their respective axial forces in the opposite directions to those of the aforementioned case of the acceleration. However, the ring gear 7 is not allowed to move rightward more than the position shown in FIG. 3, nor is the sun gear shaft 19 allowed to move leftward so that the multi-disc clutch 29 is not engaged. In short, the multi-disc clutch 29 is not engaged during deceleration to effect no differential restraint so that no torque is transmitted through the multi-disc clutch 29 between the front wheels and the rear wheels. This will be separately described in connection with the front and rear wheels. Even if either the front wheels or the rear wheels are locked when the vehicle is braked, the locked wheels receive no forced torque transmitted from the other wheels. In other words, the front and rear wheels observe their intrinsic behaviors according to the weight of the vehicle body and the situations of the road so that an anti-skid brake control system (i.e., ABS), if any, can become effective to exhibit excellent braking performance. Moreover, the tight corner braking phenomenon during forward movement can be eliminated substantially completely since it is not established in the least until the torque for causing the braking operation, i.e., for braking the sun gear shaft, is overcome by the engine torque. This is because the engine torque is generally dropped during cornering. During reverse movement, on the other hand, the braking phenomenon can be completely eliminated absolutely independently of the engine torque.

The embodiments thus far described are constructed such that torque transmission is established among the pinion gear 6, the ring gear 7 and the sun gear 8 to transform the accompanying tangential force into the engaging force of the multi-disc clutch 29. As a result, the force for engaging the multi-disc clutch 29 is not generated positively at the center differential, in case the rear or front wheels are stuck, to make it difficult to extricate the car from the stuck state. This difficulty can be obviated by adding the structure, described below with reference to FIG. 4.

Figure 4:
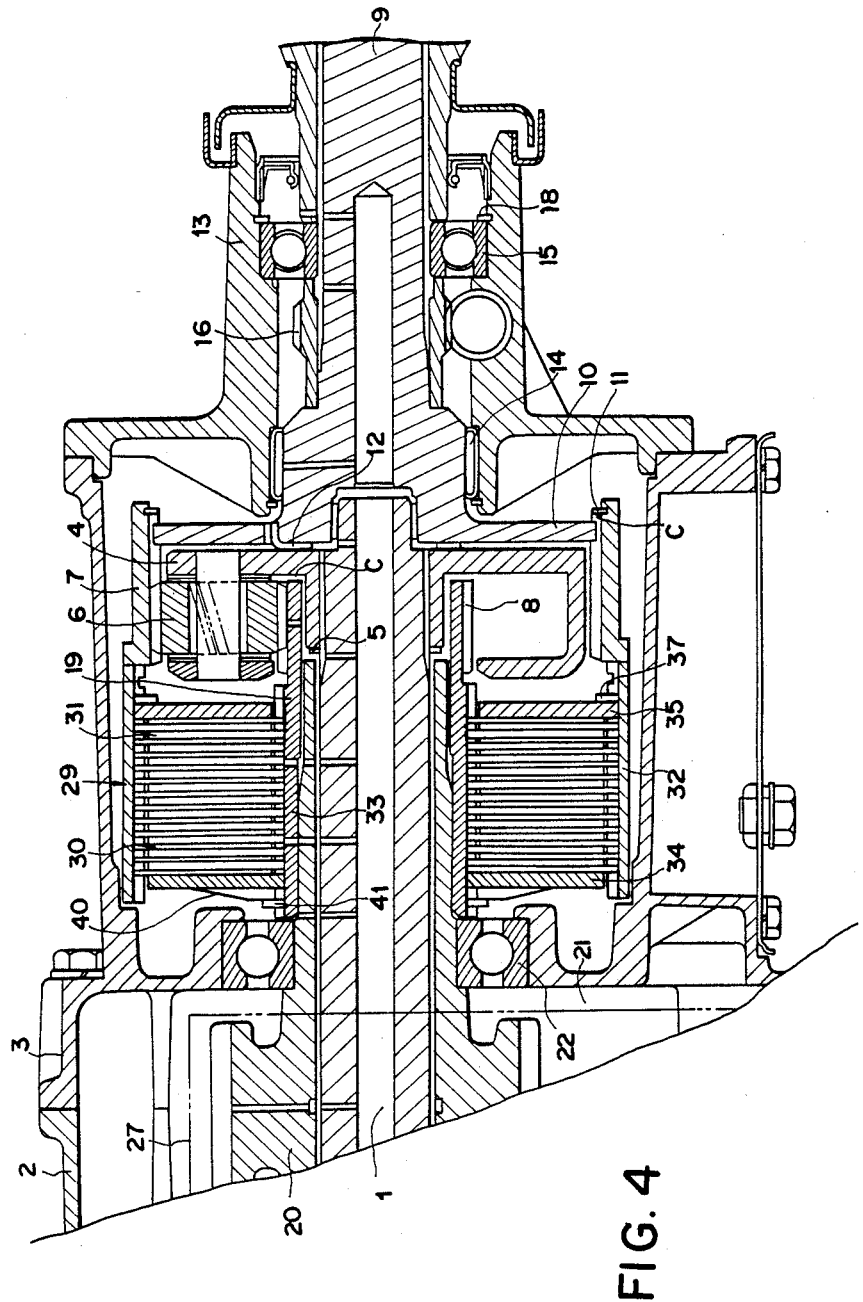
FIG. 4 is a sectional view showing an essential portion of a fourth embodiment.

The structure shown in FIG. 4 is modified from that of FIG. 3 such that the back plate 34 fitted on the clutch hub 33 is pushed toward the clutch discs 30 by means of a belleville spring 40. For this operation, the back plate 34 is so fitted on the clutch hub 33 that it can move rightward and leftward in the axial direction, and the belleville spring 40 is fixed on the back side (the left-hand side in FIG. 4) of the back plate 34 by means of a snap ring 41. As a result, the multi-disc clutch 29 is preloaded by the belleville spring 40 so that the accompanying frictional force always effects differential restraint between the ring gear 7 and the sun gear 8, i.e., between the rear wheels and the front wheels. Thus, even if either the front or rear wheels are stuck, the remaining wheels never fail to receive torque so that the vehicle can be released from the stuck state by the driving force.

With the structure shown in FIG. 4, moreover, the pushing direction by the belleville spring 40 is identical to that of the axial force to be exerted upon the multi-disc clutch 29 during acceleration so that the differential restraining capacity for acceleration is higher than that obtained from the aforementioned embodiment of FIG. 3. Still moreover, the belleville spring 40 acts even during deceleration so that differential restraint is effected to some extent. Exclusively for getting out from the stuck state, on the other hand, the gears 6, 7 and 8 may be spur gears because the differential restraining capacity need not be increased for acceleration or deceleration.

A fifth embodiment of the present invention will be described with reference to FIG. 5.

This embodiment is an improvement over the embodiment of FIG. 2 and is constructed such that, in a low-torque state for cornering, i.e., in the state where the spring force exceeds the thrust force of the ring gear, differential restraint is completely released to set the center differential free. The sun gear shaft 19 has one end abutting against the bearing 22 holding the drive sprocket 20 and its other end interposing a thrust bearing 42 between itself and the carrier 4. As a result, the sun gear shaft 19 is locked in the axial direction. The back plate 34 fitted on the clutch drum 32 and the snap ring 36 for regulating the position of the back plate 34 are spaced at a predetermined clearance C smaller than the clearance C formed between the flange 10 and the snap ring 38. The remaining construction is similar to that shown in FIG. 2.

Figure 5:
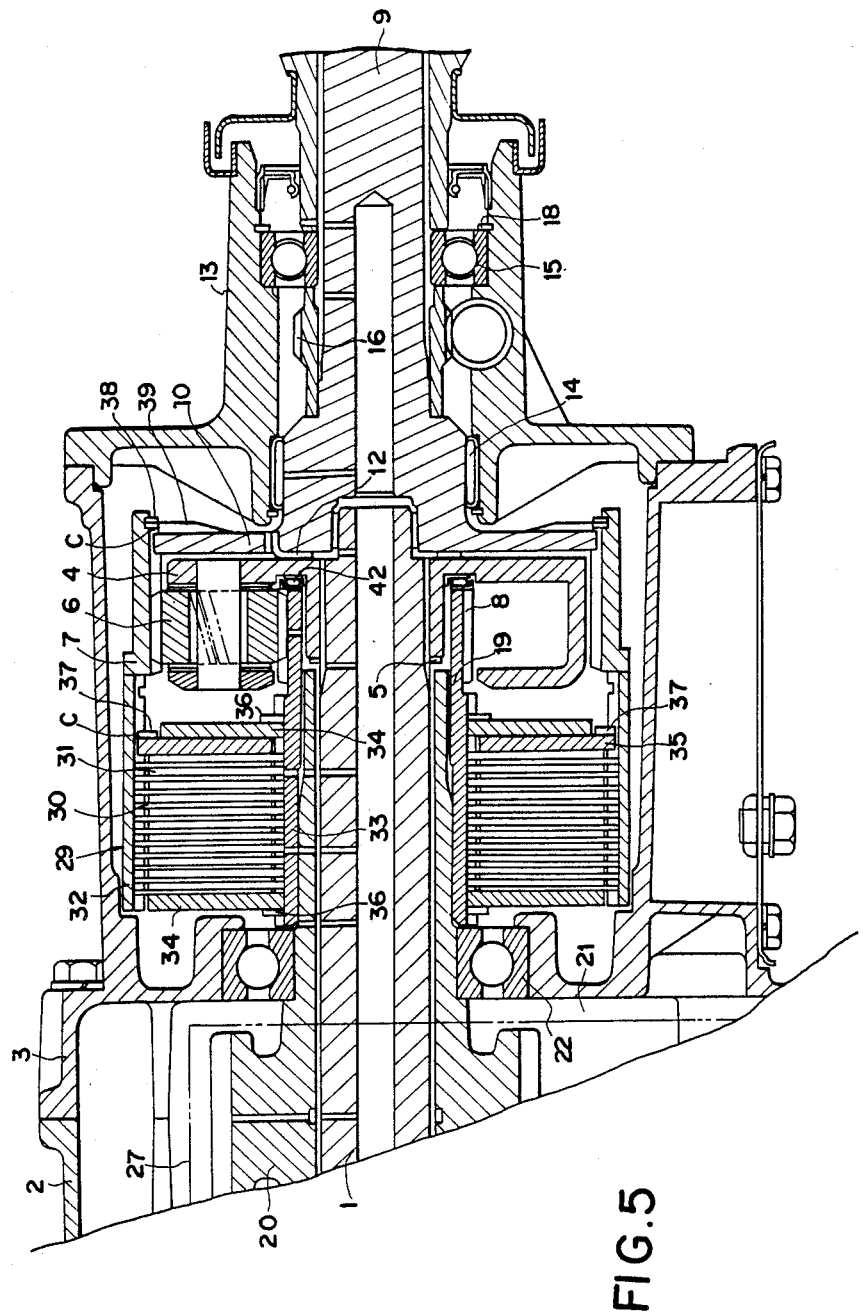
FIG. 5 is a sectional view showing an essential portion of a fifth embodiment.

With the structure shown in FIG. 5, when torque is input for acceleration from the carrier 4, axial force in the leftward direction of FIG. 5 is exerted upon the ring gear 7, as has been described hereinbefore. Since, however, the ring gear 7 is preloaded rightward in FIG. 5 by the belleville spring 39, it moves together with the clutch drum 32 in the axial direction when its preload is overcome by the axial force resulting from the input torque. In this case, the clearance C is formed between the back plate 34 and the snap ring 36 so that no force is applied to the multi-disc clutch 29 until the clearance C is reduced to zero. If the axial force according to the input torque gradually increases so that the clearance C disappears, the back plate 36 pushes the clutch plates 31 and the clutch discs 30 so that the multi-disc clutch 29 is engaged to effect differential restraint with its frictional force. The increasing tendency of the clutch engaging force, i.e., the differential restraining torque in this case is generally proportional to the input torque but is gentle with a small constant of proportion because the elastic force of the aforementioned belleville spring 39 acts to reduce the engaging force and increases according to the deflection. In other words, the input torque and the differential restraining capacity can be turned by the belleville spring 39.

Thus, with the construction shown in FIG. 5, no differential restraint is effected before the input torque grows to some extent. As a result, no braking phenomenon is caused because the accelerator pedal is released to reduce the torque for cornering run, for example.

Next, a sixth embodiment of the present invention will be described in the following. This embodiment makes it possible to increase the more and adjust properly the engaging force of the multi-disc clutch for the differential restraining force.

Figure 6:
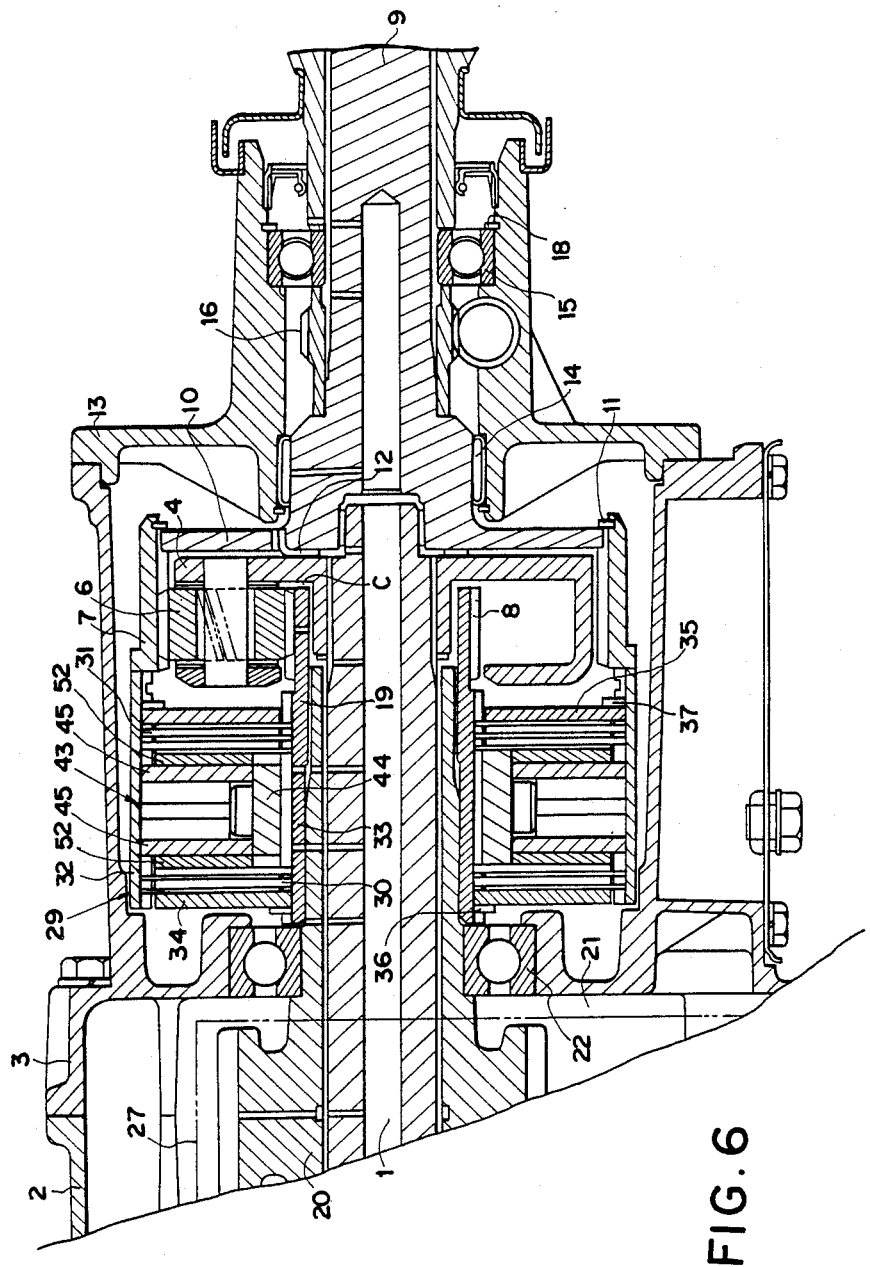
FIG. 6 is a sectional view showing an essential portion of a sixth embodiment.
Figure 7A:
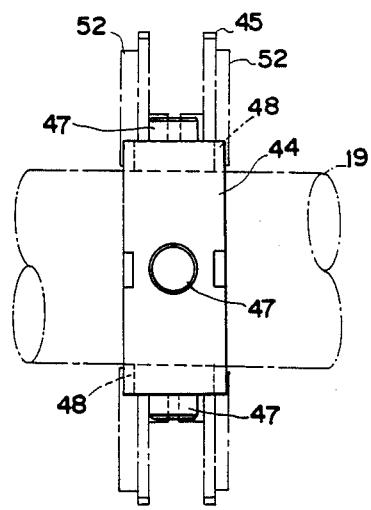
FIGS. 7(A) and 7(B) are front and side elevations of a spider to be used in the sixth embodiment.
Figure 7B:
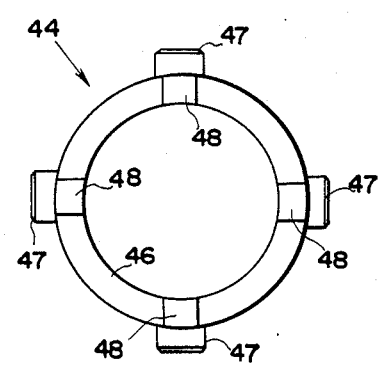
Figure 8A:
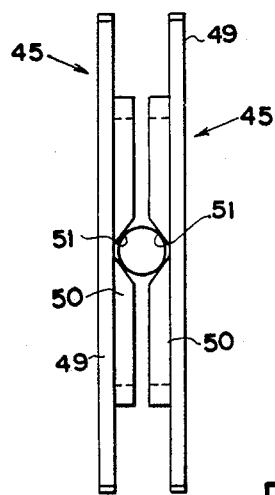
FIGS. 8(A) and 8(B) are front and side elevations of cam plates to be used in the sixth embodiment.
Figure 8B:
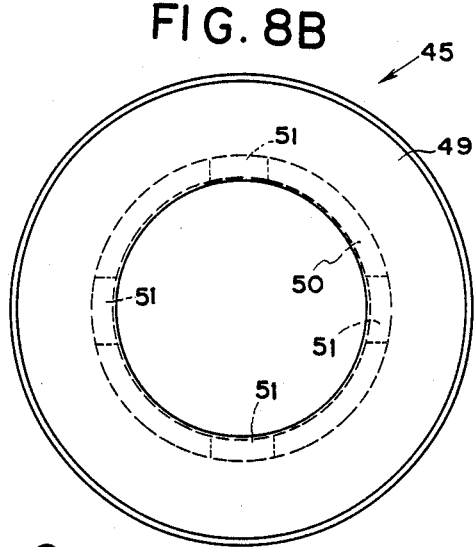

An essential portion of the structure of this embodiment is constructed, as shown in FIG. 6, such that the multi-disc clutch is engaged by both axial force generated at the center differential and axial force generated at a cam mechanism. The multi-disc clutch 29 is constructed by arranging many clutch discs 30 and clutch plates 31 alternately and by fitting them on the clutch drum 32 and the clutch hub 33. The multi-disc clutch 29 thus constructed is equipped at its center with a cam mechanism 43 for transforming tangential force into axial force. This cam mechanism 43 is composed of a spider 44 acting as a cam member, as shown in FIGS. 7(A) and 7(B), and a pair of cam plates 45 acting as cam followers, as shown in FIGS. 8(A) and 8(B). The spider 44 is made by forming four projections 47 of circular section on the outer circumference of a ring 46 to be fitted loosely on the outer circumference of the aforementioned sun gear shaft 19 and notches 48 for obstructing rotation in the righthand and lefthand sides of the ring 46 in positions corresponding to the projections 47. On the other hand, each of the cam plates 45 is to be fitted on the outer circumference of the ring 46 of the spider 44 and has a pressure plate 49 and a boss 50 which is formed at one side of the pressure plate 49. The boss 50 has an external diameter equal to that of the leading ends of the projections 47 and four cam faces 51 to contact the outer circumferences of the projections 47. The pressure plate 49 has splines on its outer circumferential edge to engage with those of the clutch drum 32. The cam faces 51 provide slopes which are opened at a predetermined angle $\theta$ with respect to the axial direction in a manner to contain the projection 47 so that they may coact with the projection 47 to transform force in the rotational direction (i.e., the tangential force) into the axial force according to that angle $\theta$.

The spider 44 thus made is so fitted on the sun gear shaft 19 at the center of the multi-disc clutch 29 in the axial direction as to rotate and move in the axial direction. The paired cam plates 45 are so fitted on the outer circumference of the ring 46 as to have their bosses 50 facing each other and their cam faces 51 fitted on the projections 47. Moreover, the cam plates 45 are splined to the clutch drum 32. At the two sides of (or across) the cam plates 45, respectively, there are arranged two plates 52 which are to come into face-to-face contact with the clutch discs 30 or plates 31. Each of the plates 52 is in engagement, while its rotation is regulated, with the notches 48 of the ring 46 of the spider 44 such that it can rotate and move in the axial direction with respect to the clutch drum 32 and the clutch hub 33.

Thus, the connection between the clutch hub 33 and the clutch drum 33 through the cam mechanism 43 is achieved as follows: (the splined joint between the clutch hub 33 and the clutch plates 31)—(the sliding contact between the clutch plates 31 and the plates 52)—(the engagement between the plates 52 and the spider 44)—(the engagement between the spider 44 and the cam plates 45 through the projections 47)—(the splined joint of the cam plates 45 to the clutch drum 30).

In the structure shown in FIG. 6, the ring gear 7 is fixed on the flange 10 of the rear wheel output shaft 9 so that it may not move in the axial direction, but the sun gear shaft 19 is allowed to move only in the rightward direction because the clearance C is formed only at the righthand end thereof, as shown in FIG. 6. Moreover, the back plate 35 for receiving the rightward portion of the multi-disc clutch 29 is fitted on the clutch drum 32, and the other back plate for exerting the rightward force upon the multi-disc clutch 29 is fitted on the clutch hub 33. The remaining construction is similar to that of FIG. 1.

With the structure shown in FIG. 6, when the accelerator pedal is depressed for acceleration, for example, axial force in the leftward direction, as viewed in FIG. 6, is exerted upon the ring gear 7 whereas rightward axial force is exerted upon the sun gear shaft 19 by the torque inputted from the carrier 4. Since the ring gear 7 is fixed in the axial direction, only the sun gear shaft 19 is moved rightward of FIG. 6 so that the pressure of the back plate 34 is applied to the multi-disc clutch 29 to bring the clutch discs 30, clutch plates 31, back plates 34, 35 and 52 and cam plates 45 into face-to-face engagements for transmitting the torque. If, in this state, the rear wheels slip, for example, a difference in the number of rotations is caused between the ring gear 7 and the sun gear 8, i.e., between the clutch drums 32 and the clutch hubs 33. In this case, the spider 44 is connected to the clutch hub 33 because the plates 52 engaging with the notches 48 are in sliding contact with the clutch plates 31, whereas the cam plates 45 are splined to the clutch drum 32 so that a force in the rotational direction is generated between the spider 44 and the cam plates 45. Since, however, the spider 44 and the cam plates 45 are engaged by their projections 47 and cam faces 51, an axial force is generated in the tangential direction to move the paired cam plates 45 apart from each other. As a result, the clutch discs 30 and the clutch plates 31 across the cam mechanism 43 are more strongly forced into contact to strengthen the engaging force of the multi-disc clutch 29. In short, with the multi-disc clutch 29 in this engagement, differential restraint of the center differential is strengthened to restrain the differential of the front and rear wheels so that torque which would otherwise unnecessarily be applied to the rear wheels, due to the slip of the rear wheels, as has been described hereinbefore, can be applied to the front wheels to ensure stable operation without substantial loss of the driving force.

Here, the magnitude of axial force to be generated by the aforementioned cam mechanism 43 can be adjusted by an angle $\theta$ of the cam faces 51, and the engaging force of clutch discs 30 and the clutch plates 31 can also be adjusted by not only the axial force but also the radial position of the aforementioned plates 52. As a result, the adjustment (or tuning) of the differential restraining capacity can be accomplished with ease by using the cam mechanism 43 thus far described.

Incidentally, the structure shown in FIG. 6 accomplishes differential restraint only during the acceleration. If, however, the ring gear 7 and the sun gear 8 are made suitably movable in the axial direction by setting a clearance to exert a corresponding load upon the multi-disc clutch 29, differential restraint according to the input torque can be performed during deceleration, too.

Figure 9:
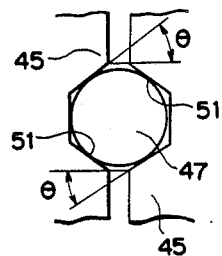
FIG. 9 is an enlarged view showing the cam face of the cam plates.
Figure 10:
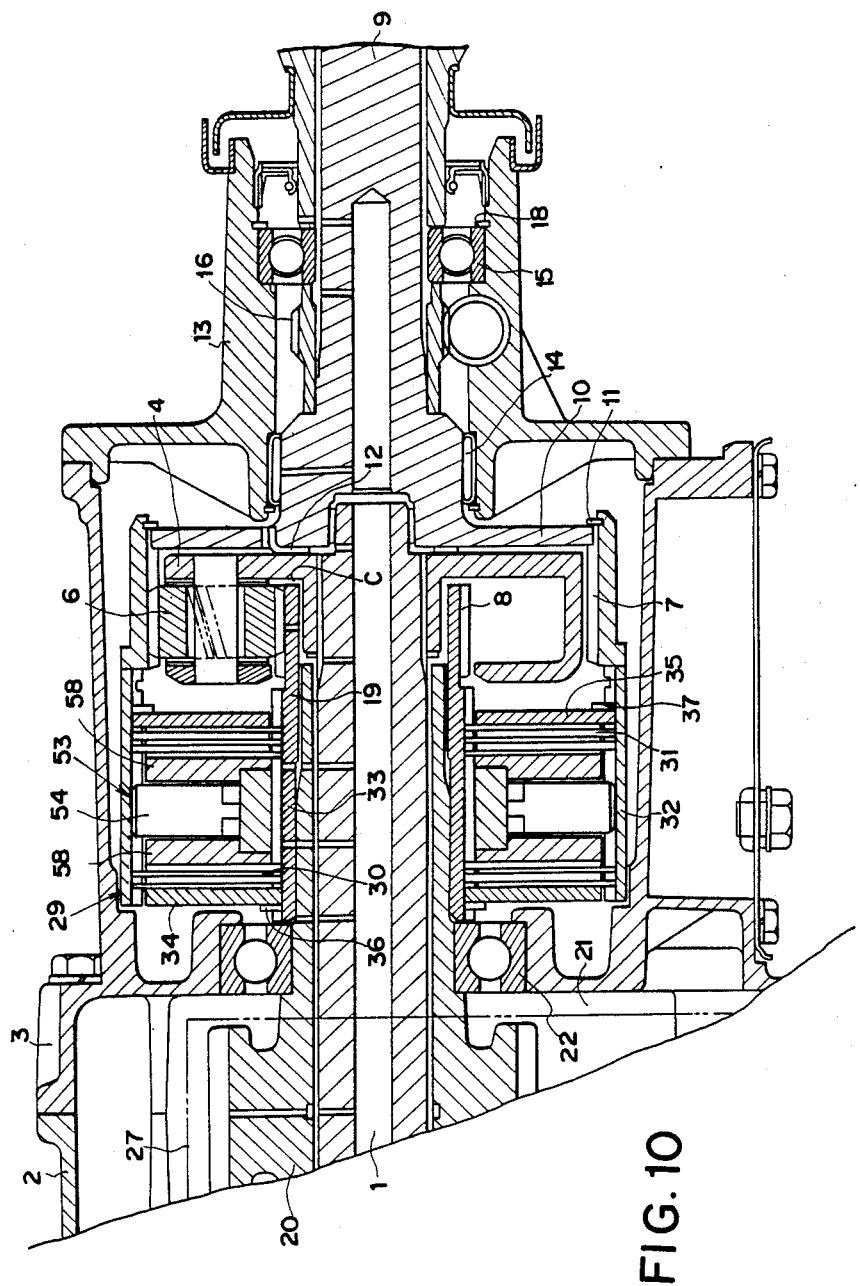
FIG. 10 is a sectional view showing an essential portion of a seventh embodiment of the present invention.
Figure 11A:
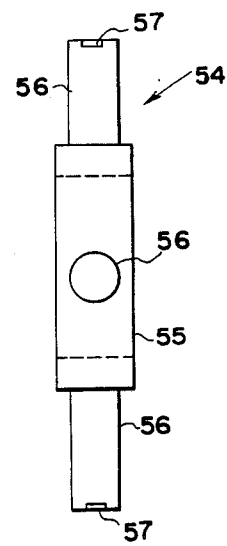
FIGS. 11(A) and 11(B) are front and side elevations of a spider to be used in the seventh embodiment.
Figure 11B:
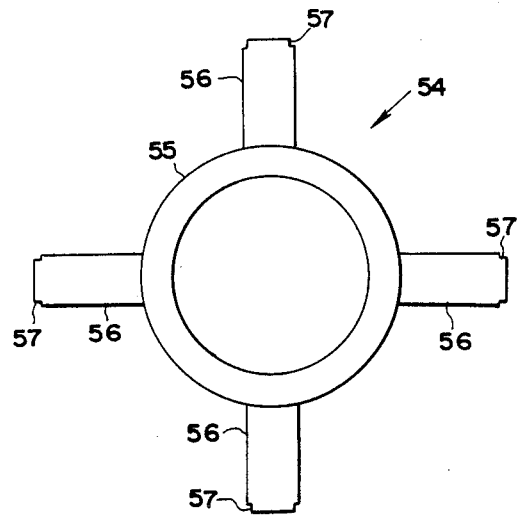
Figure 12A:
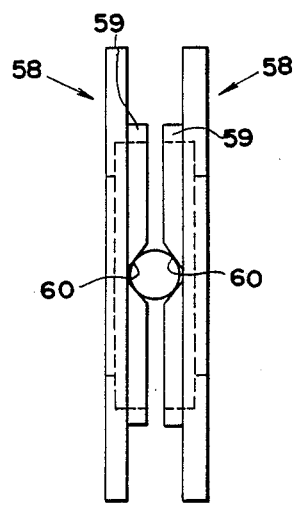
FIGS. 12(A) and 12(B) are front and side elevations of cam plates to be used in the seventh embodiment.
Figure 12B:
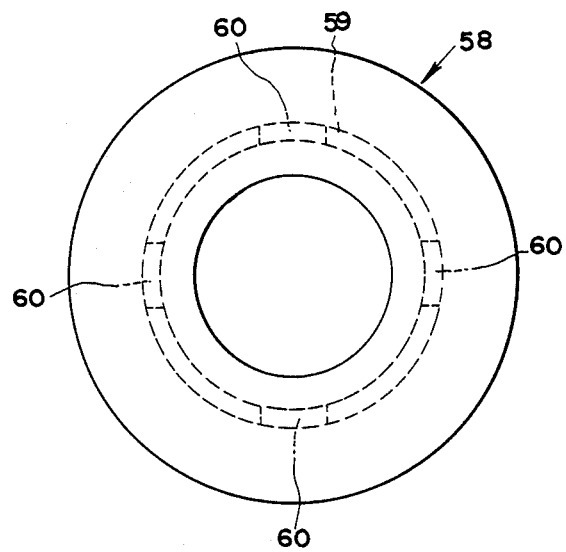

FIG. 10 shows an embodiment in which is used a cam mechanism 53 having the spider engaging with the clutch drum 32, as is different from the structure of FIG. 6. As shown in FIGS. 11(A) and 11(B), the spider designated at 54 is made by forming four projections 56 of circular section on the outer circumference of a ring 55 fitted loosely on the outer circumference of the clutch hub 33, by setting the size of the projections 56 to the leading ends thereof substantially equal to the internal diameter of the clutch hub 33 and by forming the leading ends of the projections 56 with engagement portions 57 to be splined. On the other hand, cam plates 58 act as the back plates of the multi-disc clutch 29 and are made, as shown in FIGS. 12(A) and 12(B), of annular discs which have internal and external diameters to be fitted loosely on the inner circumference of the ring 55 of the spider 54 and the inner circumference of the clutch drum 32. Each of the cam plates 58 is formed on one side with a boss 59 which in turn is formed with four cam faces 60 similar to those of FIG. 9.

The spider 54 is fitted loosely on the outer circumference of the clutch hub 33 with the leading ends of its projections 56 engaging with the splines of the clutch hub 32. The paired cam plates 58 are so fitted on the outer circumference of the ring 55 of the spider 54 while having their cam faces 60 holding the projections 56 as to move in the axial direction. The clutch plates 31 are in face-to-face contact with the cam plates 58 so that the clutch hub 33 and the clutch drum 32 are connected as follows: (engagement of the clutch plates 31 with the clutch hub 33)— (face-to-face contact between the clutch plates 31 and the cam plates 58)—(engagement between the cam plates 58 and the spider 54 through the cam faces)—(engagement of the spider 54 with the clutch drum 32). The remaining construction is similar to that shown in FIG. 6.

With the structure shown in FIG. 10, if the rear wheels slip during acceleration, relative rotations are caused between the ring gear 7 and the sun gear 8, i.e., between the clutch drum 32 and the clutch hub 33. In this case, the spider 54 rotates together with the clutch drum 32. Since the cam plates 58 are connected to the clutch hub 33 while being in face-to-face contact with the clutch plates 31, a force in the rotational direction is exerted between the spider 54 and the cam plates 58 to generate an axial force on the cam faces 60 on the basis of the tangential component of the former force. This tangential force will move the paired cam plates 58 apart from each other so that a pushing force for bringing the clutch discs 30 and the clutch plates 31 into engagement is exerted upon the multi-disc clutch 29.

Thus, in the individual embodiments shown in FIGS. 6 and 10, the engaging force transforming means is composed of the cam mechanism 43 or 53 together with the center differential using the helical gears and the members to be moved by the axial force caused by the center differential.

The cam mechanisms 43 or 53 thus far described can augment the engaging force to be exerted axially upon the multi-disc clutch 29. For generating this axial force, it is necessary to generate a relative torque between the ring gear 7 and the sun gear 8, i.e., between the clutch drum 32 and the clutch hub 33. In case either the front or rear wheels stick, no torque is exerted even with a difference in the number of rotations so that the torque cannot be transmitted to the wheels retaining their tire gripping forces. In order to cope with this situation, it is preferable to provide the cam mechanism 43 or 53 with a suitable spring such as a belleville spring 40 for preloading the multi-disc clutch 29 in the foregoing fourth embodiment.

Figure 13:
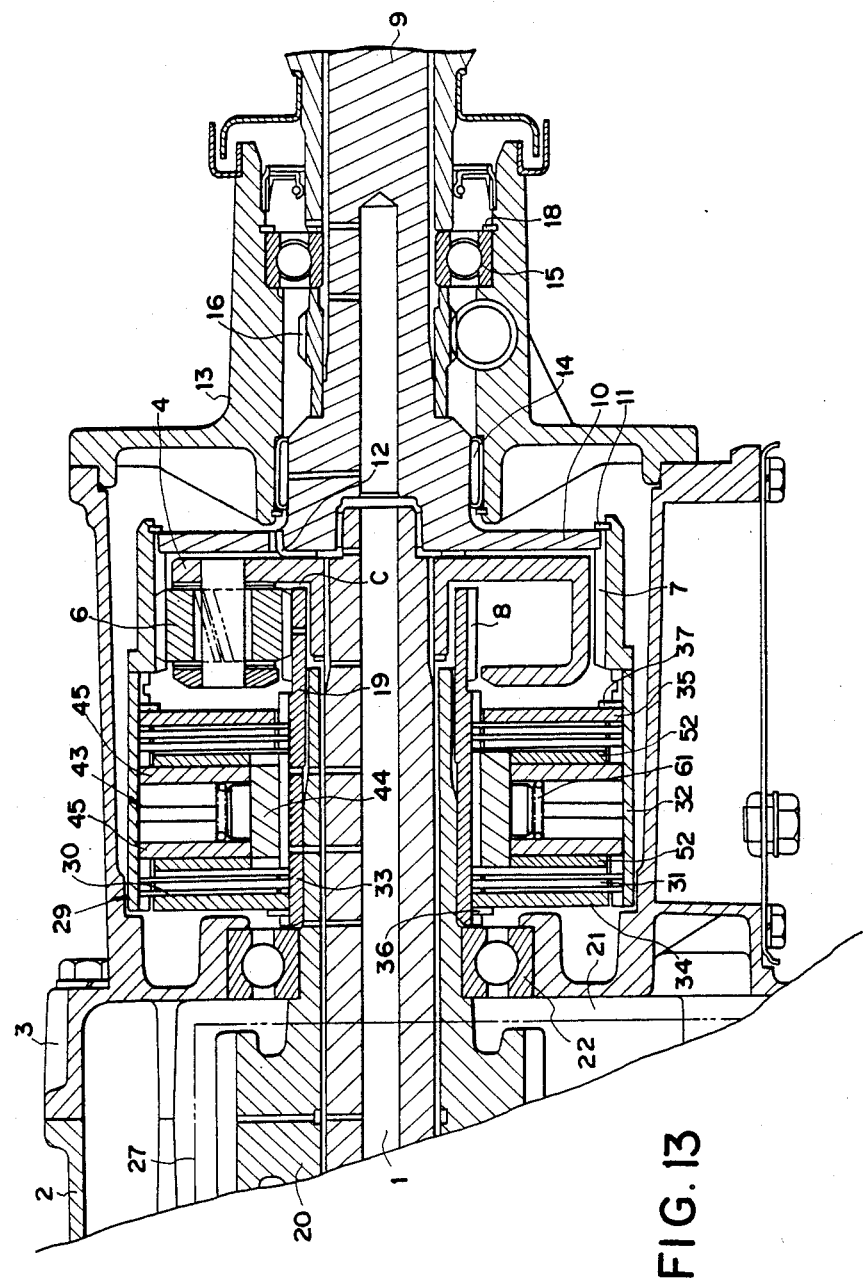
FIG. 13 is a sectional view showing an essential portion of an eighth embodiment of the present invention.

FIG. 13 is a sectional view showing another embodiment for that modification. This embodiment is constructed on the basis of the structure shown in FIG. 6 by holding a coil spring 61 around the outer circumference of the spider 44 between the cam plates 45 and by urging the cam plates 45 apart from each other with that coil spring 61 to preload the multi-disc clutch 29.

Figure 14:
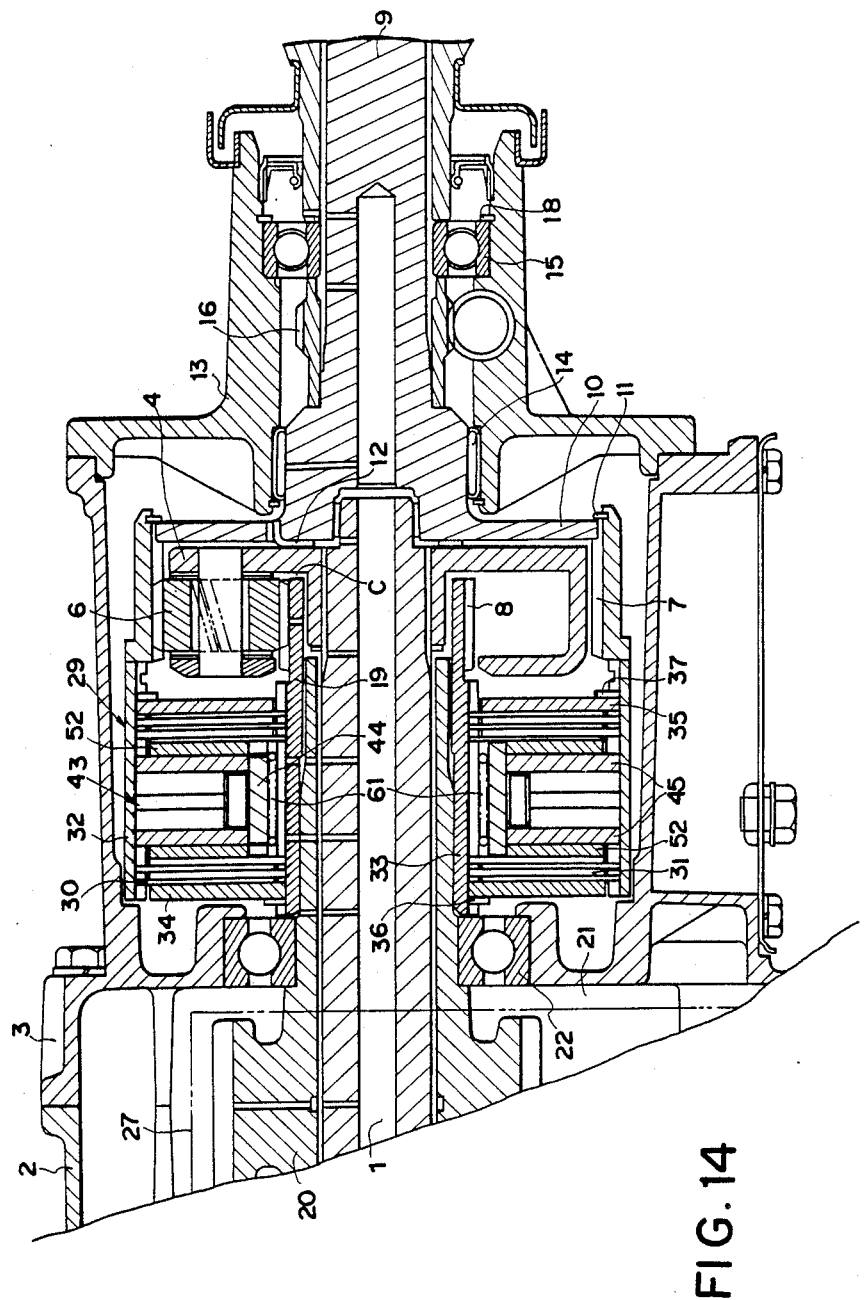
FIG. 14 is a sectional view showing an essential portion of a ninth embodiment of the present invention.

In still another modified embodiment shown in FIG. 14, the coil spring 61 is arranged concentrically between the outer circumference of the clutch hub 33 and the inner circumference of the spider 44.

Figure 15:
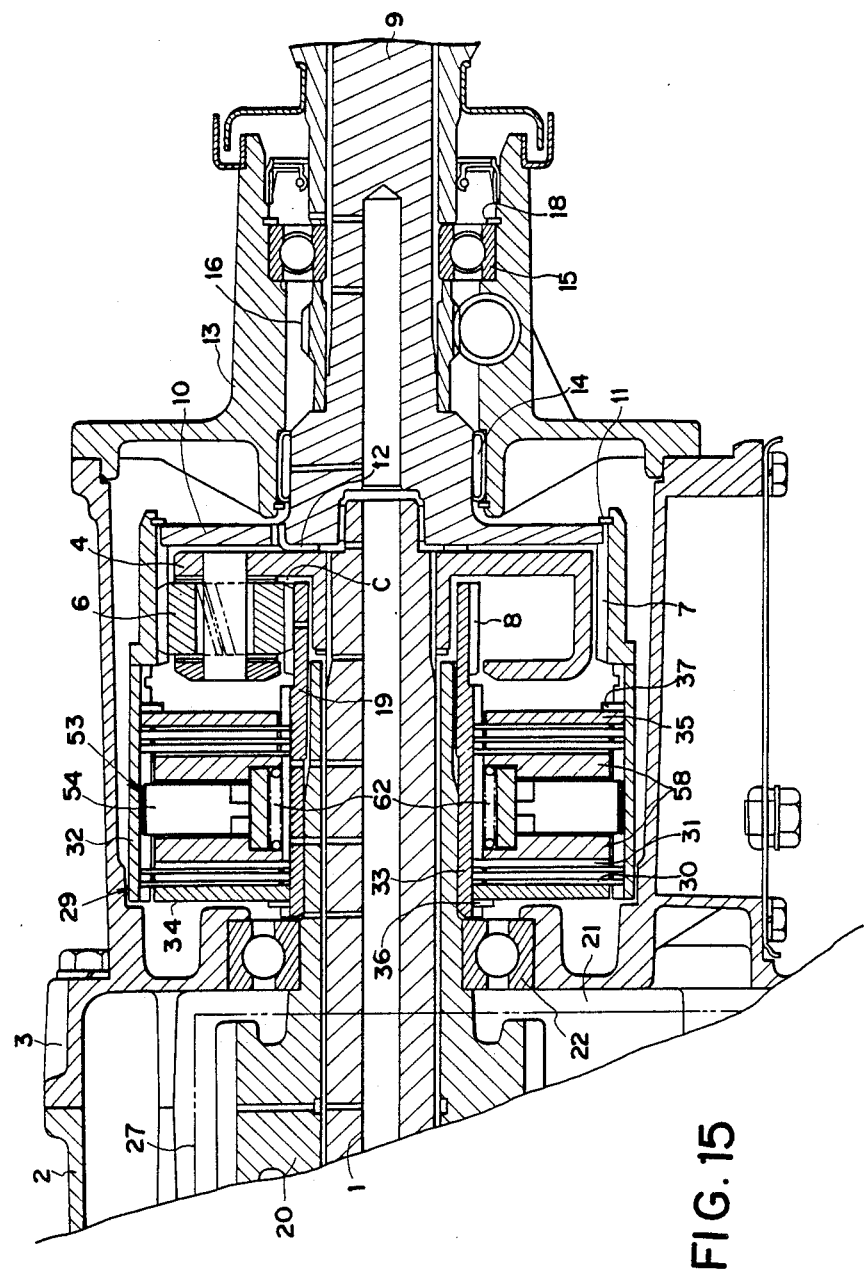
FIG. 15 is a sectional view showing an essential portion of a tenth embodiment of the present invention.

In a further modified embodiment shown in FIG. 15 and based upon the structure shown in FIG. 10, there is held concentrically between the outer circumference of the clutch 33 and the inner circumference of the spider 54 a coil spring 62 by which are urged the cam plates 58 apart from each other to preload the multi-disc clutch 29.

In any of the modified structures thus far described, the clutch discs 30 fitted on the clutch drum 32 and the clutch plates 31 fitted on the clutch hub 33 are pushed into contact by a axial force of constant magnitude. When the clutch drum 32 and the clutch hub 33 are rotated relative to each other when the front or rear wheels stick, tangential force is exerted between the spider 44 or 54 and the cam plates 45 or 58 by frictional force between the clutch plates 31 and the plates 52 or cam plates 58 so that axial force is established by the cam faces 51 or 60 to engage the multi-disc clutch 29 intensely. In short, if either the front or rear wheels stick, the center differential is restrained so that the torque, which is not required because of the idle rotations, can be imparted to the other wheels to release the vehicle from the stuck state.

With the structures shown in FIGS. 13 to 15, as will be apparent from the description thus far made, the cam mechanisms 43 or 53 function as the engaging force transforming means for imparting the axial force to the multi-disc clutch 29. This makes it unnecessary to apply the axial force elaborately in the center differential. Therefore, the individual gears 6, 7 and 8 of the center differential may be spur gears in the case of the constructions shown in FIGS. 13 to 15. If the structure shown in FIG. 13 is compared with the structures shown in FIGS. 14 and 15, the former structure of FIG. 13 can be made with the external diameter of the coil spring 61 the larger to establish a stronger preload.

Figure 16:
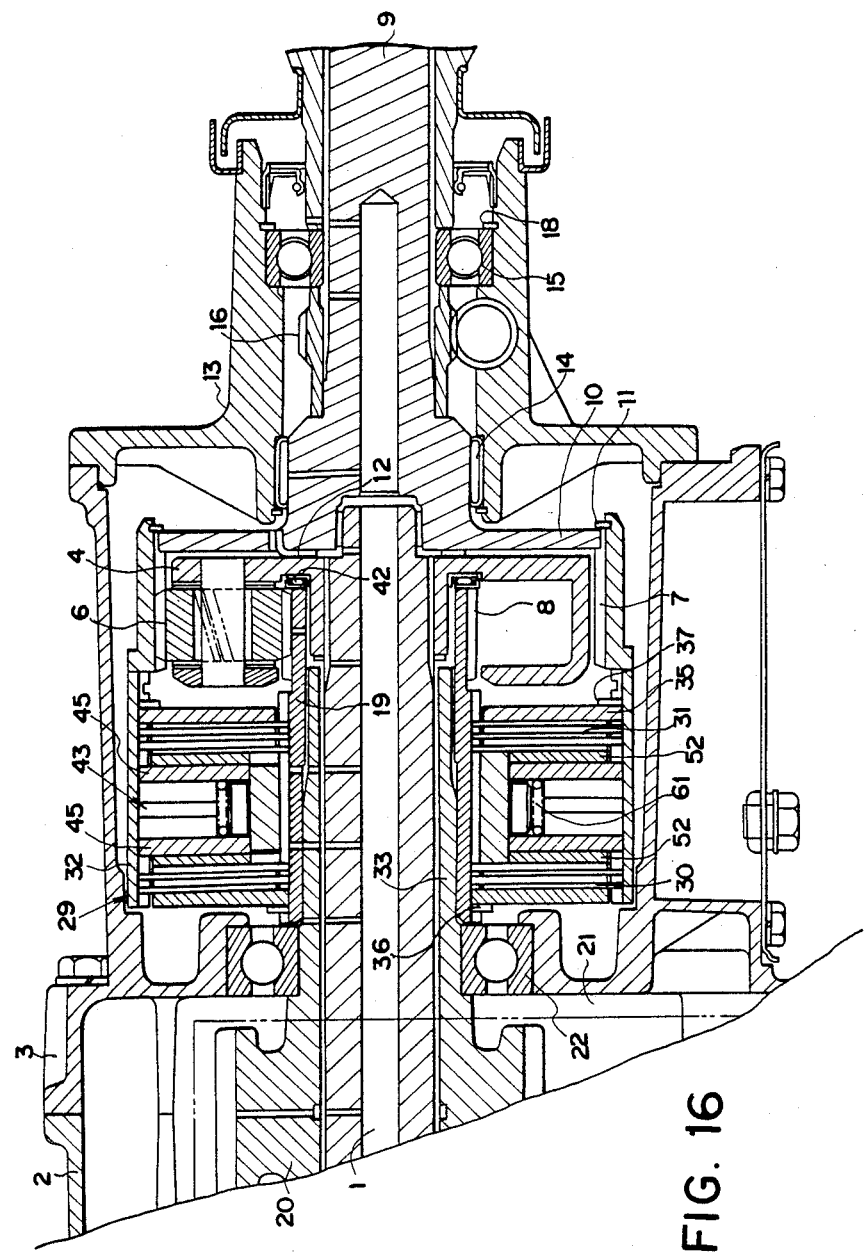
FIG. 16 is a sectional view showing an essential portion of an eleventh embodiment of the present invention.
Figure 17:
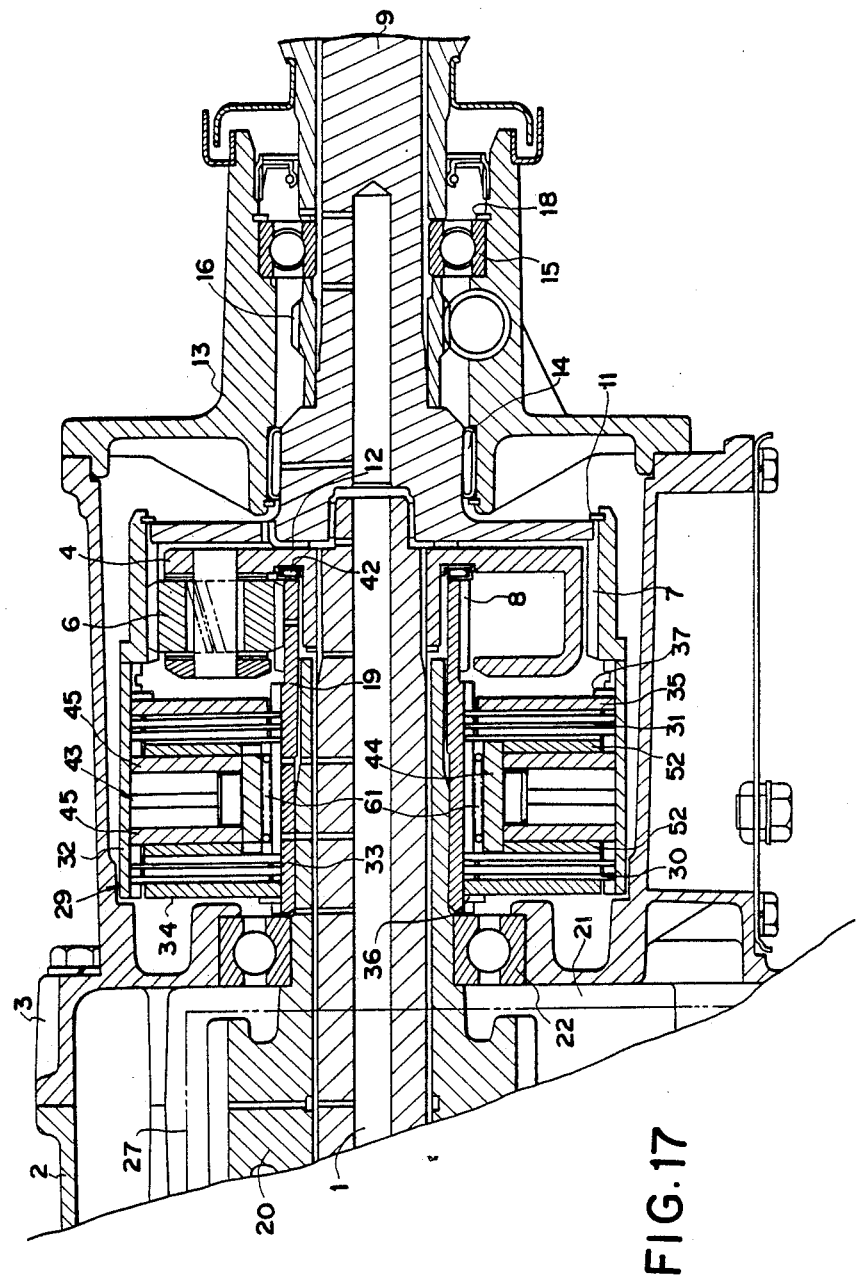
FIG. 17 is a sectional view showing an essential portion of a twelfth embodiment of the present invention.
Figure 18:
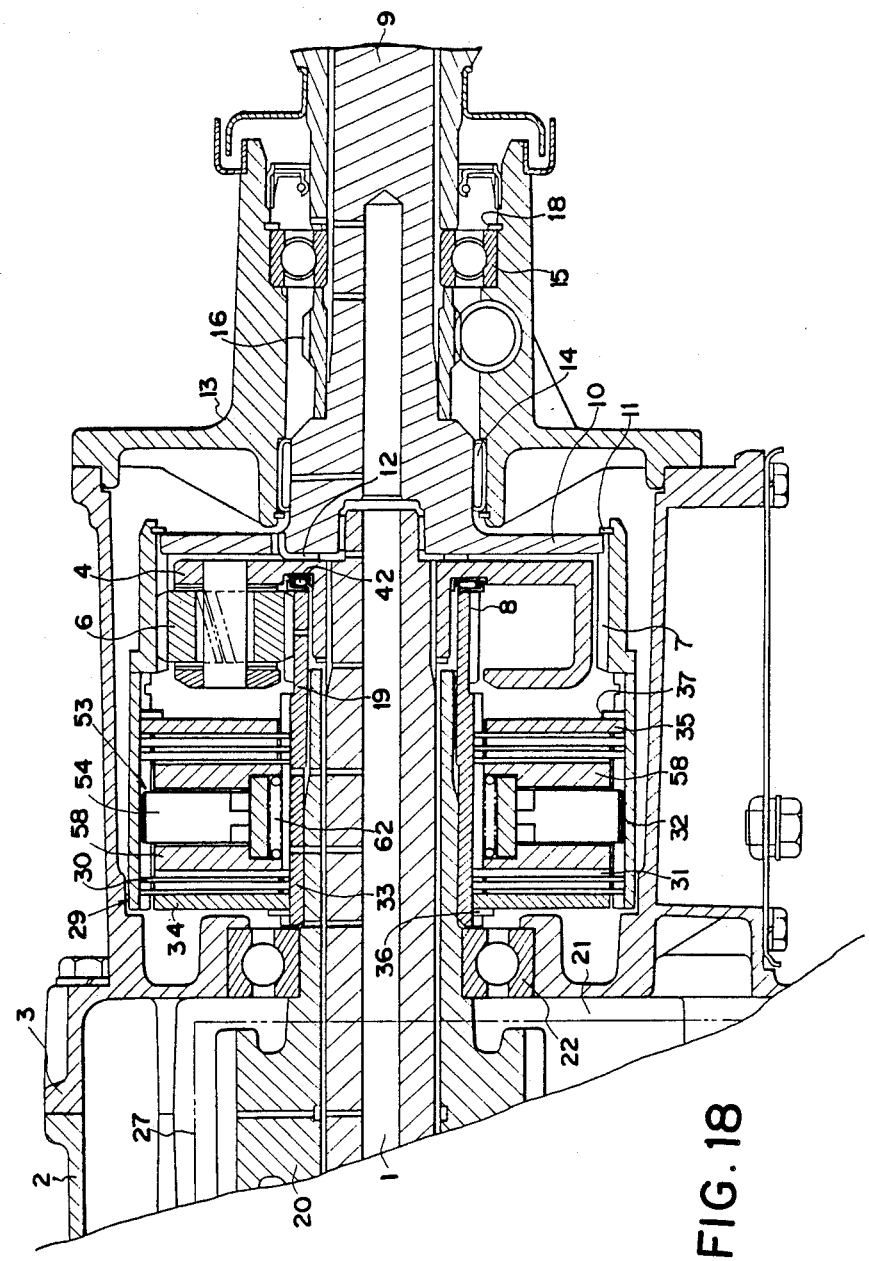
FIG. 18 is a sectional view showing an essential portion of a thirteenth embodiment of the present invention.

FIGS. 16 to 18 are sectional views showing eleventh to thirteenth embodiments of the present invention. These embodiments are improved over the aforementioned structures of FIGS. 13 to 15 so as to eliminate the influences of the input torque.

In the eleventh embodiment shown in FIG. 16, the thrust bearing 42 is held between the righthand end of the sun gear shaft 19 and the carrier 4 to fix the sun gear shaft 19 in the axial direction while leaving the remaining construction similar to that shown in FIG. 13.

In this embodiment, both the ring gear 7 and the sun gear shaft 19 are fixed in the axial direction. Even if any axial force is established because of the presence of torque input from the carrier 4, the multi-disc clutch 29 is not engaged so that the differential restraining capacity is not adversely affected by the input torque.

FIG. 17 is a sectional view showing a twelfth embodiment of the present invention. In this embodiment, the coil spring 61 of the foregoing eleventh embodiment is arranged between the outer circumference of the clutch hub 33 and the inner circumference of the spider 44, and the individual gears 6, 7 and 8 of the center differential are spur gears.

With this structure, too, it is possible to avoid the input torque from influencing the differential restraining capacity. If the structure shown in FIG. 16 is compared with the structure shown in FIG. 17, the former structure of FIG. 16 allows the external diameter of the coil spring 61 to larger so that the preload by the coil spring 61 can be increased.

FIG. 18 is a sectional view showing a thirteenth embodiment of the present invention. This embodiment is improved over the foregoing structure of FIG. 15 in that the thrust bearing 42 is held between the carrier 4 and the end of the sun gear shaft 19 to fix the sun gear shaft 19 in the axial direction and such that the individual gears 6, 7 and 8 of the center differential are spur gears.

This structure can attain the advantages similar to those of the embodiment shown in FIG. 16.

In the eleventh to thirteenth embodiments thus far described, the ring gear 7 and the sun gear 8 are fixed in the axial direction so that the back plates 34 and 35 at the righthand and lefthand ends of the multi-disc clutch 29 do not apply the load positively to the clutch discs 30 and the clutch plates 31 but bear only the axial force of the cam mechanism 43 or 53. Therefore, both the righthand and lefthand back plates of the multi-disc clutch 29 may be fitted on the clutch hub 33 or the clutch drum 32. Then, no axial force is exerted upon the fitting portions of the ring gear 7 and the sun gear 8 so that a higher load can be applied to the multi-disc clutch 29.

A fourteenth embodiment of the present invention will be described in the following. The structure of this embodiment is improved, as shown in FIG. 19, over the structure of the foregoing third embodiment.

In the partition of the rear casing 3 from the chain chamber 21, there is fitted a center support 64 from which projects a boss 63 to the center differential. On the outer circumference of this boss 63, there is fitted rotatably and axially movably a collar 65 which is formed at the lefthand end of the sun gear shaft 19, as viewed in FIG. 19. To the end of the collar 65, there is fixed a bottomed cylindrical drum 66 which is directed toward the center differential. The clutch plate 31 is splined to the inner circumference of the leading end (located at the righthand side of FIG. 19) of that drum 66, which has its leading end portion providing the clutch drum. Here, the sun gear shaft 19 is spaced by a clearance C from the carrier 4 and has its opposite end fixed by a snap ring 67 so that it can move rightward in FIG. 19. This enables the clutch drum to move rightward in FIG. 19. Therefore, the back plate 35 is arranged at the lefthand end of FIG. 19 and fixed by the snap ring 37.

Figure 19:
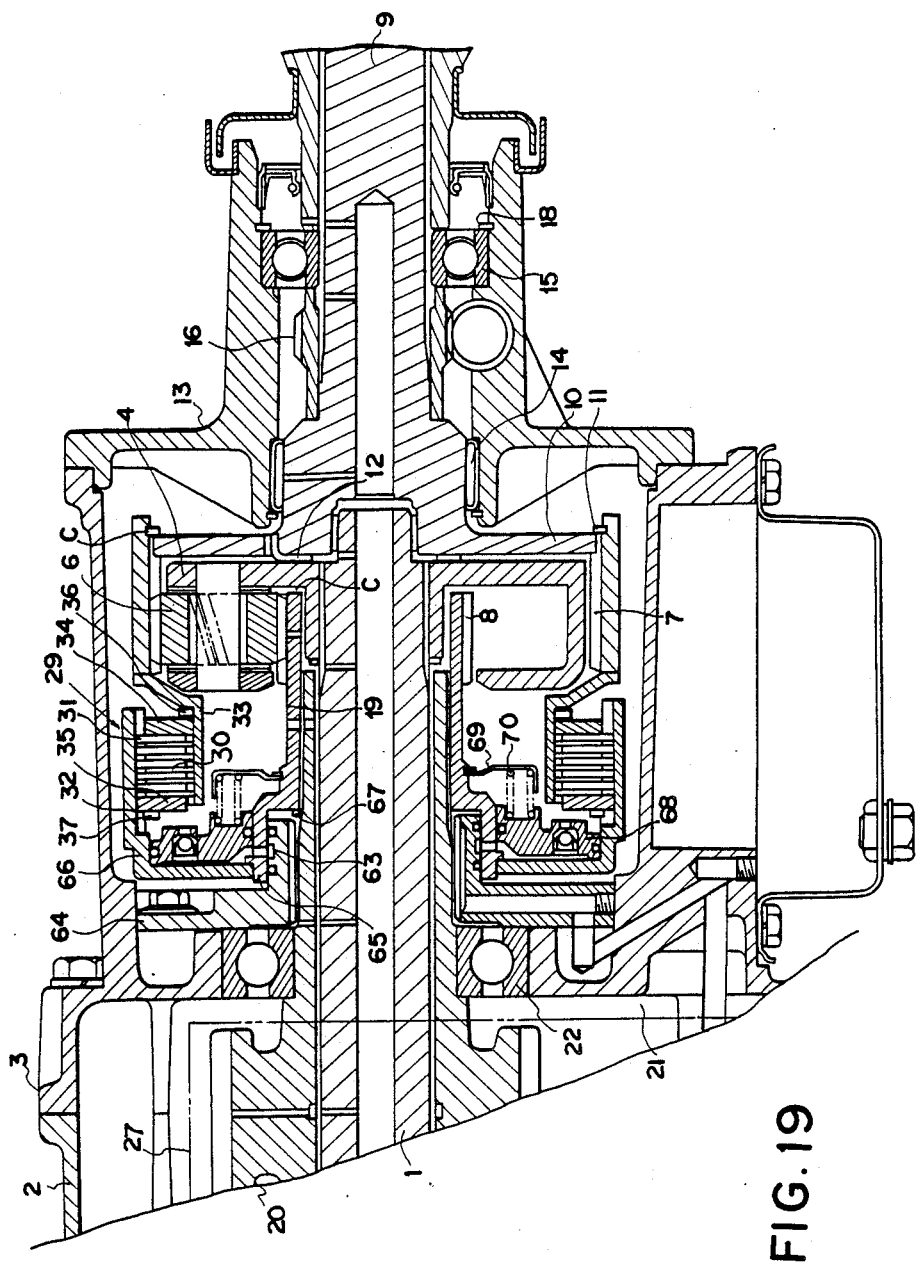
FIG. 19 is a sectional view showing an essential portion of a fourteenth embodiment of the present invention.

At the inner circumferential side of the clutch drum, on the other hand, there is arranged the clutch hub 33 which is connected and fixed to the ring gear 7 made movable leftward in FIG. 19. A multiplicity of clutch discs 30 are splined to the outer circumference of that clutch hub 33. The back plate 34 for pushing the clutch plates 31 and the clutch discs 30 in the axial direction as the ring gear 7 moves in the axial direction is arranged at the righthand end of the clutch hub 33, as viewed in FIG. 19, and is fixed by the snap ring 34. The individual gears 6, 7 and 8 of the center differential are made of helical gears. When torque is input from the carrier 4, the ring gear 7 and the clutch hub 33 are moved leftward in FIG. 19 whereas the sun gear 7 and the clutch drum are moved rightward in FIG. 19 by the axial force generated at the center differential so that the multi-disc clutch 29 is engaged to effect differential restraint according to the input torque.

On the outer circumference of the collar 65 of the aforementioned sun gear shaft 19, there is fitted a piston 68 which is in sealing and sliding contact with the inner circumference of the aforementioned drum 66. That piston 68 is fed at its back with an oil pressure through both an oil groove formed in the boss 63 of the aforementioned center support 64 and an oil port formed through the cylindrical portion of the sun gear shaft 19. On the front of the piston 68, there is arranged a return spring 70 which is retained by a retainer 69. As a result, the piston 68 thus constructed applies the multi-disc clutch 29 when it is fed with the oil pressure and moved forward.

With the structure constructed above, like the foregoing third embodiment, the multi-disc clutch 29 can be engaged by axial force generated at the center differential during acceleration or deceleration to effect differential restraint according to the input torque. When either the front or rear wheels stick, the piston 68 is moved forward to engage the multi-disc clutch 29 thereby to effect differential restraint between the ring gear 7 and the sun gear 8 if it is fed with oil pressure at its back. As a result, the torque unnecessary due to the idle rotation of the wheels is applied to the other wheels so that the vehicle can be released from the stuck state.

Incidentally, the structure shown in FIG. 19 may be modified such that the back plate 35 at the piston 68 is supported directly by the piston 68 by removing the snap ring 37 supporting it. With this modification, the stepwise control of the differential restraining capacity during acceleration and the release of differential restraint can be accomplished by controlling the oil pressure.

In the structure shown in FIG. 19, moreover, the control of the differential restraining capacity is mechanically performed according to the input torque, and the piston 68 restrains the center differential and releases the restraint. Therefore, the drive source for this structure may be a simple oil pressure source, which is exemplified either by using the oil pressure source of an automatic transmission, if so, to be mounted in front of the transfer, or by providing a small-sized oil pressure source if the transmission is of a manual type.

In the individual embodiments thus far described, the multi-disc clutch 29 is arranged in front of the center differential (i.e., at the side of the transmission). This arrangement is adopted merely for following the direction of the axial force to be generated at the center differential. If the helix angle of the helical gears of the center differential is inverted from that of the foregoing embodiments, the frictional applying means such as the multi-disc clutch for restraining the differential can be disposed at the opposite side to that of the foregoing embodiments. Then, the clearance C is also set at the opposite side. In the foregoing embodiments, moreover, the center differential is constructed of the planetary gear set of single pinion type. However, the present invention should not be limited to those embodiments but can be modified such that the center differential is constructed of a planetary gear set of double pinion type. If the aforementioned cam mechanism is used, still moreover, the center differential can be constructed of a differential gear set of bevel type, too.

In the present invention, on the other hand, the frictional applying means for the differential restraint should not be limited to the construction, in which it is interposed between the output members of the center differential, but can be interposed between the input member and one of the output members.

As has been described hereinbefore, according to the present invention, the tangential force to be generated between the input member and one of the output members or between the output members of the center differential is transformed by the engaging force transforming means into axial force, by which the frictional engaging means is engaged to effect differential restraint. This construction makes unnecessary any special device requiring the driving force such as the oil pressure source so that it can be remarkably simplified. Thus, the present invention can be properly applied to not only a vehicle having an automatic transmission but also a vehicle having a manual transmission. At the same time, any delay in the response can be eliminated to execute differential restraint in quick response to the road situations.

In case the engaging force transforming means is constructed of the helical gears of the center differential and the members made movable in the axial direction by the axial force established at the tooth surfaces of those gears, differential restraint can be accomplished according to the input torque such that it can be minimized or released while the vehicle is running at a low torque for cornering. This makes it possible to prevent tight braking phenomenon, as is different from the case using the viscous coupling or TORSEN differential. Since use is made of the axial force to be inevitably generated by the helical gears, the member such as a thrust bearing, which has been used for bearing the thrust in the prior art, is made dispensable so that the number of parts can be reduced to simplify the construction. The tuning can be facilitated because the differential restraining capacity of the input torque can be changed through the helix angle of the helical gears.

If, on the other hand, the engaging force transforming means is constructed of a cam mechanism for transforming tangential force into axial force, the present invention can be practised without any structural change in the existing center differential but can generate a higher axial force. The magnitude of this axial force itself can be easily adjusted to simplify the socalled "tuning".

What is claimed is:

1. A center differential for a fourwheel drive vehicle including a transmission unit, comprising a planetary gear mechanism comprising a helical sun gear, a helical ring gear, a helical pinion gear in mesh with the sun gear and the ring gear, and a carrier holding the pinion gear,
   a first member from the group consisting of said sun gear, said ring gear, and said carrier being coupled to an input shaft for transmitting a drive force from the transmission unit, a second member from said group being coupled to a rear wheel output shaft, and a third member from said group being coupled to a front wheel output shaft.
   a clutch hub disposed coaxially of said sun gear and formed integral with said sun gear, said clutch hub being mounted so as to allow for axial reciprocal motion,
   a plurality of clutch plates in spline engagement with an outer periphery of said clutch hub,
   a clutch drum disposed coaxially of said clutch hub and formed integral with said ring gear, said clutch drum being mounted so as to allow for axial reciprocal motion,
   a plurality of clutch discs in spline engagement with the inner periphery of said clutch drum, said clutch discs and said clutch plates being alternately disposed,
   a first back plate disposed on one axial end of the alternately disposed clutch plates and clutch discs, and mounted to said clutch drum without allowing axial movement away from said clutch plates and said clutch discs, and
   a second back positioned opposite to said first back plate with respect to said clutch plates and said clutch discs, and mounted to said clutch hub without allowing axial movement away from said clutch plates and said clutch discs.

2. A center differential according to claim 1, wherein said clutch discs and said clutch plated are held between said first back plate fixed to said clutch drum and said second back plate fixed to said clutch hub, wherein said first and second back plates are prevented by snap rings from moving apart from said clutch discs or said clutch plates, wherein said clutch drum is movable together with said ring gear in the axial direction, wherein said clutch hub is movable together with said sun gear in the axial direction, and wherein said carrier is immovable in the axial direction.

3. A center differential according to claim 2, wherein a third back plate for contacting with the opposite side of said first back plate to the side of said clutch plates is fixed to said clutch hub while being prevented from moving in the axial direction, and wherein a fourth back plate for contacting the opposite side of said second back plate to the side of said clutch discs is fixed to said clutch drum while being prevented from moving in the axial direction.

4. A center differential according to claim 2, wherein an elastic member for pushing said second back plate toward said clutch discs is interposed between said second back plate and a snap ring for preventing any movement of said second back plate.

5. A center differential according to claim 1, wherein said ring gear is so splined to the outer circumference of a flange formed at the end of said rear wheel output shaft as to move in the axial direction, wherein said clutch hub is so splined to the boss of a drive sprocket as to move in the axial direction, and wherein said drive sprocket is connected through a chain to a driven sprocket fixed on said front wheel output shaft.

6. A center differential according to claim 1, wherein said ring gear is so splined to the outer circumference of a flange formed at the end of said rear wheel output shaft as to move in the axial direction, and wherein an elastic member for urging said ring gear and said clutch drum in a direction to disengage said frictional applying means is interposed between said ring gear and said flange.

7. A center differential according to claim 6, wherein said elastic member is a belleville spring.

8. A center differential according to claim 6, wherein said clutch discs and said clutch plates are held between said first back plate fixed to said clutch drum and said second back plate fixed to said clutch hub, wherein said first and second back plates are prevented by snap rings from moving apart from said clutch discs or said clutch plates, a third back plate for contacting with the opposite side of said first back plate to the side of said clutch plates is fixed to said clutch hub while being prevented by a snap ring from moving apart from said first back plate, and wherein said clutch hub is movable together with said sun gear in the axial direction.

9. A center differential according to claim 6, wherein said clutch discs and said clutch plates are held between a first back plate fixed to said clutch drum and a second back plate fixed to said clutch hub, wherein said first and second back plates are prevented by snap rings from moving apart from said clutch discs and said clutch plates, wherein a clearance smaller than the moving stroke of said clutch drum is formed between said first back plate and the snap ring preventing the movement of said first back plate, and wherein said clutch hub is prevented from moving in the axial direction.

10. A center differential according to claim 1, further comprising a cam mechanism.

11. A center differential according to claim 10, wherein said cam mechanism includes: a cam member having projections of circular section on the outer circumference of a ring; and a pair of cam plates holding said projections therebetween so that said projections move said cam plates apart from each other when said cam member rotates relative to said cam plates.

12. A center differential according to claim 11, wherein each of said cam plates contacts with said projections on its cam surface sloped with respect to the axial direction of said ring.

13. A center differential according to claim 11, wherein said frictional engaging means is a multi-disc clutch including: a cylindrical clutch drum having a plurality of clutch discs non-rotatably fitted on its inner circumference; and a cylindrical clutch hub having a plurality of clutch plates rotatably fitted on its outer circumference and arranged alternately with respect to said clutch discs, and wherein said cam plates are adapted to push said clutch discs and said clutch plates in the axial direction.

14. A center differential according to claim 13, wherein said input member is a carrier holding a planet pinion, wherein said first output member is a ring gear meshing with said planet pinion, wherein said second output member is a sun gear meshing with said planet pinion, wherein said clutch drum is integral with said ring gear, and wherein said clutch hub is integral with said sun gear.

15. A center differential according to claim 14, wherein said cam plates are splined to the inner circumference of said clutch drum whereas said cam member is fitted rotatably on said clutch hub, and wherein a cam plate in sliding contact with said clutch plates is nonrotatably fitted on said cam member.

16. A center differential according to claim 15, wherein an elastic member for affording a preload to push said plates apart from each other thereby to engage said frictional engaging means is arranged at the inner circumferential side of said ring and in the axial direction.

17. A center differential according to claim 14, wherein said cam mechanism is interposed at the center of said multi-disc clutch in the axial direction and between a pair of said clutch plates.

18. A center differential according to claim 17, and wherein said sun gear and said clutch hub are made movable in a direction to engage said multi-disc clutch by the force which is generated in the axial direction on the tooth surface of said sun gear when a torque is transmitted.

19. A center differential according to claim 17, wherein an elastic member for generating an elastic force to move said paired cam plates apart from each other is interposed between said cam plates for affording a preload to engage said frictional engaging means.

20. A center differential according to claim 19, wherein said elastic member is arranged at the outer circumferential side of said cam member and in the axial direction of said ring.

21. A center differential according to claim 19, wherein said elastic member is arranged at the inner circumferential side of said cam member and in the axial direction.

22. A center differential according to claim 14, wherein the leading ends of the projections of said cam member are splined to the inner circumference of said clutch drum, and wherein said cam plates are fitted rotatably on said clutch hub and are in sliding contact with said clutch plates.

23. A center differential according to claim 22, wherein said planet pinion, said ring gear and said carrier are helical gears, and wherein said sun gear and said clutch hub are movable in a direction to engage said multi-disc clutch by the force which is generated in the axial direction on the tooth surface of said sun gear when a torque is transmitted.

24. A center differential according to claim 1, wherein said frictional engaging means is a multi-disc clutch including: a cylindrical clutch drum having a plurality of clutch plates nonrotatably fitted on its inner circumference; and a cylindrical clutch hub having a plurality of clutch discs nonrotatably fitted on its outer circumference and arranged alternately with respect to said clutch plates, and wherein a hydraulic servo mechanism including a piston for pushing and engaging said multi-disc clutch is disposed on the same axis as that of said multi-disc clutch to face the same.

25. A center differential according to claim 24, wherein said input member is a carrier holding a planet pinion, wherein said first output member is a ring gear meshing with said planet pinion, and wherein said second output member is a sun gear meshing with said planet pinion.

26. A center differential according to claim 25, wherein said hydraulic servo mechanism includes a drum fitting said piston liquid-tight and movably therein, and wherein a plurality of clutch plates are splined to the inner circumference of the leading end of said drum.

27. A center differential according to claim 1 which further comprises:
a third back plate positioned on the side of said first back plate remote from said clutch plates and said clutch discs and mounted to said clutch hub without allowing axial movement away from said first back plate, and
a fourth back plate positioned on the side of said second back plate remote from said clutch plates and said clutch discs and mounted to said clutch drum without allowing axial movement away from said second back plate.

28. A center differential according to claim 1 wherein said rear wheel output shaft has a flange formed at one end thereof, said flange being in spline engagement with said clutch drum to allow for relative axial motion.

* * * * *